(12) United States Patent
Kosaka et al.

(10) Patent No.: US 11,746,799 B2
(45) Date of Patent: Sep. 5, 2023

(54) CENTRIFUGAL BLOWER

(71) Applicant: DENSO CORPORATION, Kariya (JP)

(72) Inventors: Syo Kosaka, Kariya (JP); Yuuya Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/728,740

(22) Filed: Apr. 25, 2022

(65) Prior Publication Data

US 2022/0252082 A1    Aug. 11, 2022

Related U.S. Application Data

(63) Continuation of application No. PCT/JP2020/042983, filed on Nov. 18, 2020.

(30) Foreign Application Priority Data

Dec. 6, 2019  (JP) ................. 2019-221508

(51) Int. Cl.
| F04D 29/44 | (2006.01) |
| F04D 17/10 | (2006.01) |
| F04D 29/42 | (2006.01) |
| F04D 29/70 | (2006.01) |

(52) U.S. Cl.
CPC ........... *F04D 29/441* (2013.01); *F04D 17/10* (2013.01); *F04D 29/4213* (2013.01); *F04D 29/701* (2013.01)

(58) Field of Classification Search
CPC .... F04D 29/441; F04D 17/10; F04D 29/4213; F04D 29/701; F04D 17/16; F04D 29/4246; F04D 29/703; F04D 25/08; B60H 1/00471; B60H 2001/00085; F05D 2250/51

See application file for complete search history.

(56) References Cited

U.S. PATENT DOCUMENTS

2022/0065263 A1*    3/2022    Kosaka ............... F04D 29/4246

FOREIGN PATENT DOCUMENTS

| EP | 3530955 A1 | 8/2019 |
| JP | 2019019762 A | 2/2019 |

* cited by examiner

*Primary Examiner* — Aaron R Eastman
(74) *Attorney, Agent, or Firm* — Harness, Dickey & Pierce, P.L.C.

(57) ABSTRACT

A casing, which receives a fan, has a suction port forming portion that forms a suction port. A separation tube has a tube upper end portion, which forms an air inlet, through which the air flows into an inside of the separation tube. The tube upper end portion is located on one side of the suction port forming portion in an axial direction such that the tube upper end portion overlaps with a portion of the suction port in the axial direction. A rib is formed at a periphery of the suction port. The periphery of the suction port has: an overlapping region, which overlaps with the tube upper end portion in the axial direction; and a non-overlapping region, which does not overlap with the tube upper end portion in the axial direction. The rib occupies more area in the non-overlapping region than in the overlapping region.

10 Claims, 12 Drawing Sheets

CENTRIFUGAL BLOWER

CROSS REFERENCE TO RELATED APPLICATIONS

This application is a continuation application of International Patent Application No. PCT/JP2020/042983 filed on Nov. 18, 2020, which designated the U.S. and claims the benefit of priority from Japanese Patent Application No. 2019-221508 filed on Dec. 6, 2019. The entire disclosures of all of the above applications are incorporated herein by reference.

TECHNICAL FIELD

The present disclosure relates to a centrifugal blower.

BACKGROUND

Previously, there has been proposed a centrifugal blower of a single side suction type which can separately suction vehicle cabin inside air (hereinafter, also referred to as inside air) and vehicle cabin outside air (hereinafter, also referred to as outside air) which have different temperatures or humidities. In one such a centrifugal blower, an air passage, which is located on an outer side of a fan in a radial direction, is partitioned by a partition wall into an upper air passage and a lower air passage which are located on one side and the other side in an axial direction of the fan. A separation tube is placed on an inner side of the fan in the radial direction to separately guide the air, which is introduced from the outside of the centrifugal blower, to the upper air passage and the lower air passage.

SUMMARY

This section provides a general summary of the disclosure, and is not a comprehensive disclosure of its full scope or all of its features.

According to the present disclosure, there is provided a centrifugal blower that includes a fan, a casing and a separation tube. The casing has a suction port forming portion that forms a suction port, into which air is suctioned. The separation tube has a tube upper end portion, which forms an air inlet, through which the air flows into an inside of the separation tube. The tube upper end portion is located on one side of the suction port forming portion in an axial direction such that the tube upper end portion overlaps with a portion of the suction port in the axial direction. A rib, which projects toward one side in the axial direction, is formed at a periphery of the suction port of the suction port forming portion. The periphery of the suction port has: an overlapping region, which overlaps with the tube upper end portion in the axial direction; and a non-overlapping region, which does not overlap with the tube upper end portion in the axial direction. The rib occupies more area in the non-overlapping region than in the overlapping region.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
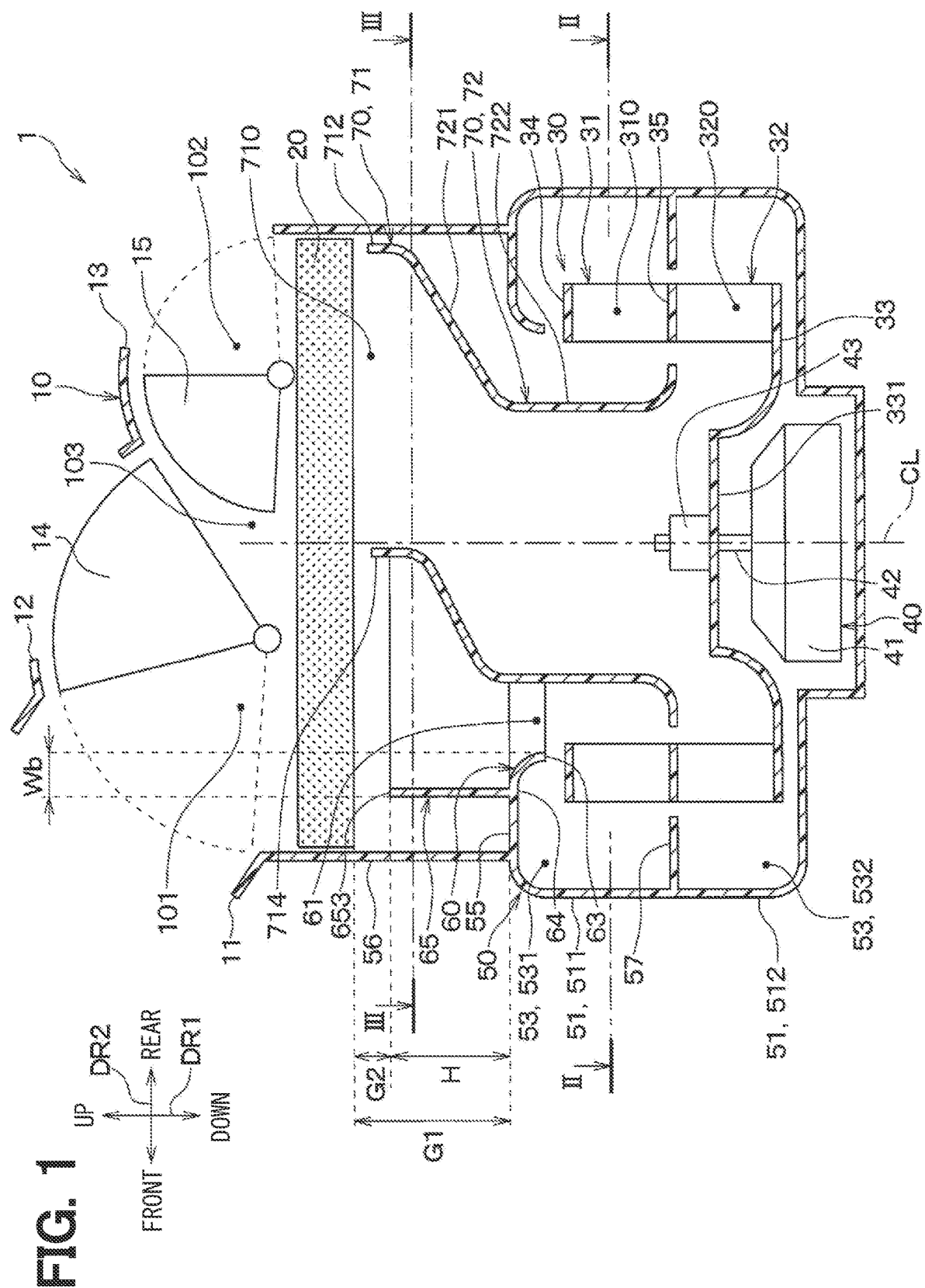
FIG. 1 is a schematic axial cross-sectional view of a centrifugal blower according to a first embodiment.

Previously, there has been proposed a centrifugal blower of a single side suction type which can separately suction vehicle cabin inside air (hereinafter, also referred to as inside air) and vehicle cabin outside air (hereinafter, also referred to as outside air) which have different temperatures or humidities. In one such a centrifugal blower, an air passage, which is located on an outer side of a fan in a radial direction, is partitioned by a partition wall into an upper air passage and a lower air passage which are located on one side and the other side in an axial direction of the fan. A separation tube is placed on an inner side of the fan in the radial direction to separately guide the air, which is introduced from the outside of the centrifugal blower, to the upper air passage and the lower air passage. The separation tube is provided with a tube upper end portion. The tube upper end portion forms an air inlet and is in a plate form that has a cross-section shaped in a rectangle. With this arrangement, a portion of the air, which is introduced from the outside, flows from the air inlet of the tube upper end portion and is conducted to the lower air passage through the inside of the separation tube and the fan. The rest of the air, which is introduced from the outside, flows through the outside of the separation tube without passing through the air inlet of the tube upper end portion and is conducted to the upper air passage through the fan. As discussed above, this centrifugal blower suctions the air from the one side of the fan in the axial direction and separately discharges the suctioned air into the upper air passage and the lower air passage.

In the above centrifugal blower, at a casing, which receives the fan, a portion of a suction port forming portion, which forms a suction port of the air, is covered with the tube upper end portion. Therefore, the air, which passes through the outside of the separation tube without passing through the air inlet of the tube upper end portion, is concentrated and flows in a region of the suction port that is not covered with the tube upper end portion. In this type of blower, a flow velocity of the air, which passes through the suction port, is increased, so that noise is likely to be generated due to collision of the air to the fan. This matter is found after diligent studies by the inventors of the present application.

According to one aspect of the present disclosure, there is provided a centrifugal blower that includes:

a fan that is configured to be rotated about a fan axis such that the fan suctions at least one of a first fluid and a second fluid from one side of the fan in an axial direction of the fan axis and outwardly blows the at least one of the first fluid and the second fluid in a radial direction of the fan axis;

a casing that receives the fan; and a separation tube, at least a portion of which is placed on an inner side of the fan, wherein the separation tube is configured to separately guide the first fluid and the second fluid to the fan in a state where the first fluid and the second fluid are located at an inside and an outside, respectively, of the separation tube, wherein:

the casing has a suction port forming portion that forms a suction port, into which the air is suctioned, wherein the suction port forming portion is formed at one side of the casing in the axial direction;

the separation tube has a tube upper end portion, which forms an air inlet, through which the air flows into the inside of the separation tube;

the tube upper end portion is located on one side of the suction port forming portion in the axial direction such that the tube upper end portion overlaps with a portion of the suction port in the axial direction;

a rib, which projects toward one side in the axial direction, is formed at a periphery of the suction port of the suction port forming portion; and the periphery of the suction port has: an overlapping region, which overlaps with the tube upper end portion in the axial direction; and a non-overlapping region, which does not overlap with the tube upper end portion in the axial direction, and the rib occupies more area in the non-overlapping region than in the overlapping region.

In the case where the rib occupies more area in the non-overlapping region than in the overlapping region, it is possible to limit the concentrated flow of the air in the non-overlapping region of the suction port, which is not covered with the tube upper end portion, and thereby the flow velocity of the air, which passes through the suction port, is unlikely to become high. Therefore, the centrifugal blower of the present disclosure can limit the generation of the noise since the noise, which is caused by the collision of the air against the fan, is limited.

Hereinafter, embodiments of the present disclosure will be described with reference to the drawings. In the following embodiments, the same reference signs may be assigned to components that are the same as or equivalent to those described in the preceding embodiment(s), and the description thereof may be omitted. Further, when only some of the components are described in any of the embodiments, the description of the remaining components described in the preceding embodiment(s) can be applied to the rest of the components. The following embodiments can be partially combined with each other as long as the combination is not particularly hindered, even if not explicitly stated.

First Embodiment

The first embodiment will be described with reference to FIGS. 1 to 6. In the present embodiment, there will be described an example where a centrifugal blower 1 of the present disclosure is applied to a vehicle air conditioning apparatus of a two-layer flow type that is configured to separately suction a first fluid and a second fluid, which are air and have different temperatures or different humidities, respectively. The centrifugal blower 1 of the present embodiment is configured to separately suction the outside air (serving as the first fluid) and the inside air (serving as the second fluid).

The centrifugal blower 1 is arranged inside an instrument panel at a front side of a vehicle cabin. As shown in FIG. 1, the centrifugal blower 1 includes an inside/outside air box 10, a filter 20, a fan 30, an electric motor 40, a scroll casing 50 and a separation tube 70. Arrows, which indicate up, down front, rear, left and right in the respective drawings, indicate an up-to-down direction DR1, a front-to-rear direction DR2 and a left-to-right direction DR3 in a state where the centrifugal blower 1 is installed in the vehicle.

The inside/outside air box 10 is located at an upper side of the centrifugal blower 1. An outside-air inlet 11, through which the outside air is introduced, a first inside-air inlet 12, through which the inside air is introduced, and a second inside-air inlet 13, through which the inside air is introduced, are arranged in this order from a front side in the front-to-rear direction DR2 at an upper surface of the inside/outside air box 10. With this configuration, introduction of the outside air from the outside of the vehicle cabin into the inside/outside air box 10 is eased, and also introduction of the inside air from the inside of the vehicle cabin into the inside/outside air box 10 is eased.

A first introduction space 101, into which the outside air from the outside-air inlet 11 or the inside air from the first inside-air inlet 12 is introduced, and a second introduction space 102, into which the inside air from the second inside-air inlet 13 is introduced, are formed at an inside of the inside/outside air box 10. The first introduction space 101 and the second introduction space 102 are communicated with each other through a communication passage 103.

A first inside/outside air door 14 and a second inside/outside air door 15 are arranged at the inside of the inside/outside air box 10. The first inside/outside air door 14 is a door that selectively opens and closes the outside-air inlet 11 and the first inside-air inlet 12. The second inside/outside air door 15 is a door that selectively opens and closes the second inside-air inlet 13 and the communication passage 103. The first inside/outside air door 14 and the second inside/outside air door 15 are respectively formed by a rotary door. The first inside/outside air door 14 and the second inside/outside air door 15 may be formed by another type of door that is other than the rotary door. The centrifugal blower 1 can simultaneously and separately suction the inside air and the outside air due to the provision of the inside/outside air box 10.

The filter 20 is arranged on the lower side of the inside/outside air box 10. The filter 20 filters the air, which is introduced into the inside/outside air box 10, to capture foreign objects that are present in the air. The filter 20 is spaced from a suction port forming portion 55 of the scroll casing 50 described later by a predetermined gap (i.e., a gap having a predetermined size) G1 in the axial direction. In a plan view taken from the upper side, each of the inside/outside air box 10 and the filter 20 has a rectangular form.

The fan 30 is a centrifugal fan that suctions the air from one side of the fan 30 in an axial direction of a fan axis CL and outwardly blows the air in a radial direction of the fan axis CL. The fan 30 is formed by a sirocco fan. The fan 30 is not limited to the sirocco fan and may formed by a radial fan, a turbo fan or the like.

Here, it should be noted that the axial direction is a direction along the fan axis CL. Furthermore, the radial direction is a direction that is perpendicular to the fan axis CL and radially directed about the fan axis CL. Also, a radially outward direction about the fan axis CL is a direction away from the fan axis CL. Additionally, a circumferential direction is a direction directed circumferentially about the fan axis CL.

The fan 30 includes a plurality of primary blades 31, a plurality of secondary blades 32, a main plate 33, a side plate 34 and a separation plate 35. The primary blades 31 are arranged circumferentially about the fan axis CL. A primary inter-blade passage 310, through which the air flows, is formed between each adjacent two of the primary blades 31.

The secondary blades 32 are arranged circumferentially about the fan axis CL. The secondary blades 32 are placed on the other side which is opposite to the primary blades 31 in the axial direction. A secondary inter-blade passage 320, through which the air flows, is formed between each adjacent two of the secondary blades 32.

The main plate 33 is formed by a circular disk member which is centered on the fan axis CL. The main plate 33 has a boss 331, to which a shaft 42 of the electric motor 40 is coupled in a manner that limits relative rotation between the shaft 42 and the boss 331. A lower end of each of the secondary blades 32 is fixed to a radially outer portion of the main plate 33.

The side plate 34 is a member that reinforces the fan 30. The side plate 34 is shaped in a ring form which is centered on the fan axis CL. The side plate 34 supports a portion of each of the primary blades 31, which is located on the one side in the axial direction.

The separation plate 35 is a member that connects between the primary blades 31 and the secondary blades 32. The separation plate 35 is also a member that limits mixing of the air, which flows in each primary inter-blade passage 310 formed between the corresponding adjacent two of the primary blades 31, and the air, which flows in each secondary inter-blade passage 320 formed between the corresponding adjacent two of the secondary blades 32. The separation plate 35 is formed by a plate member which has a plate surface perpendicular to the fan axis CL and is shaped in a ring form centered on the fan axis CL. A lower end of each of the primary blades 31 is fixed to one surface of the separation plate 35 which is located on the one side in the axial direction of the fan 30, and an upper end of each of the secondary blades 32 is fixed to an opposite surface of the separation plate 35 which is located on the other side in the axial direction.

The primary blades 31, the secondary blades 32, the main plate 33, the side plate 34 and the separation plate 35 of the fan 30 are formed as a molded product that is molded integrally in one-piece by a molding technique, such as injection molding.

The electric motor 40 is an electric motor configured to rotate the fan 30. The electric motor 40 includes: a main body 41 which is configured to generate a drive force for rotating the fan 30; and the shaft 42 which is configured to be rotated by the drive force of the main body 41.

The shaft 42 extends from the main body 41 toward the one side in the axial direction of the fan 30. The shaft 42 is fixed to the main plate 33 of the fan 30 by a motor cap 43. Therefore, when the shaft 42 is rotated, the fan 30 is rotated.

The scroll casing 50 is a casing that receives the fan 30. The scroll casing 50 functions to rectify the airflow, which is radially outwardly blown from the fan 30, into a flow in a rotational direction R of the fan 30.

Figure 2:
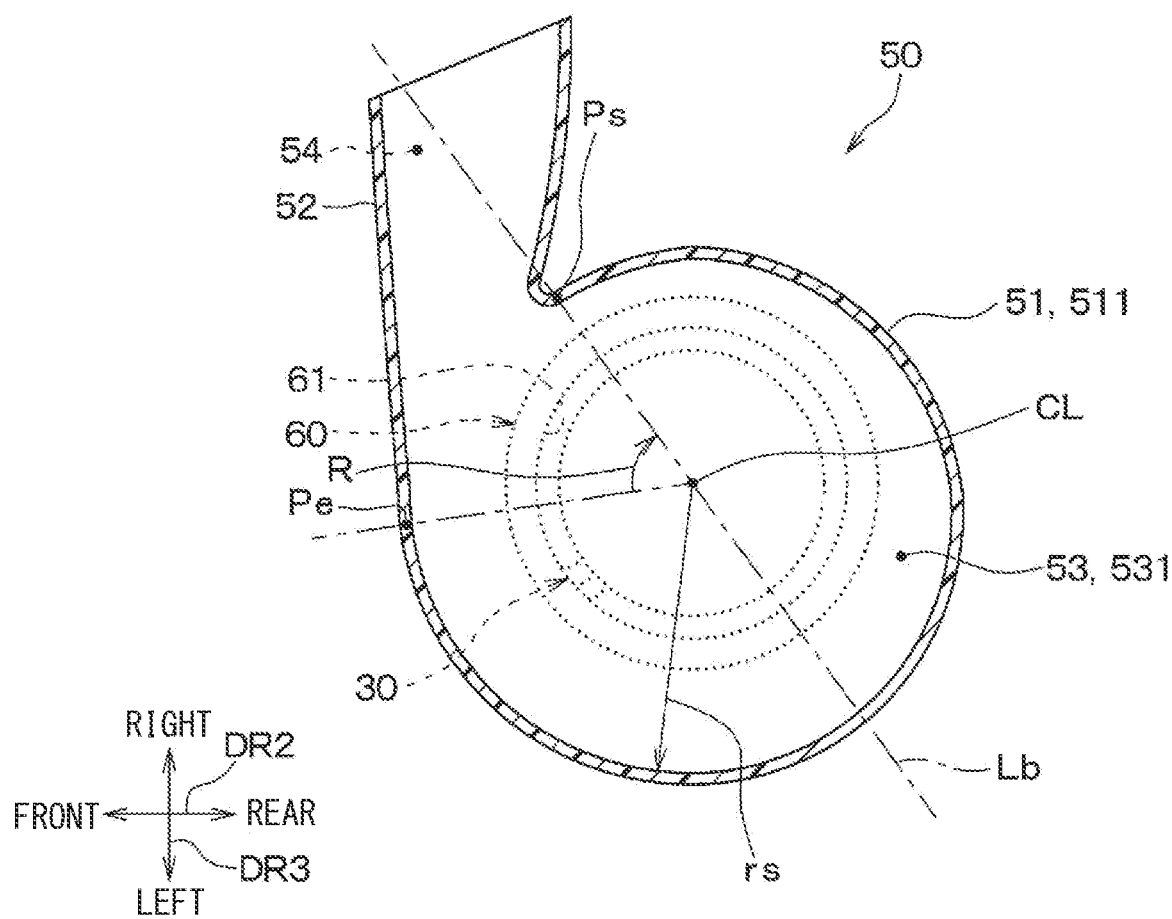
FIG. 2 is a cross-sectional view taken along line II-II in FIG. 1.

As shown in FIG. 2, the scroll casing 50 has: an outer peripheral wall 51 which is shaped in a spiral form and surrounds an outer periphery of the fan 30; and a discharge wall 52 which is connected to the outer peripheral wall 51. An air passage 53 and a discharge passage 54 are formed at an inside of the scroll casing 50. A passage cross-sectional area of the air passage 53 progressively increases in the rotational direction R of the fan 30, and a passage cross-sectional area of the discharge passage 54 is generally constant.

The scroll casing 50 has a nose Ps and a winding end Pe. In the scroll casing 50, a scroll radius rs, which is a distance from the fan axis CL to the outer peripheral wall 51, is minimized at the nose Ps, and the scroll radius rs is maximized at the winding end Pe.

The nose Ps is a starting point of the air passage 53, at which the passage cross-sectional area is minimized in the air passage 53. In the present embodiment, a line, which extends through the fan axis CL and the nose Ps, will be referred to as a reference line Lb. Furthermore, in the present embodiment, the reference line Lb is set as a reference angle (i.e., 0 degrees) of the winding angle. The winding angle refers to an angle in the circumferential direction about the fan axis CL.

The winding end Pe is an end point of the air passage 53, at which the passage cross-sectional area is maximized in the air passage 53. The winding end Pe is set at a position where the winding angle is about 260 degrees. The discharge wall 52 is connected to the winding end Pe. Unlike the outer peripheral wall 51, the discharge wall 52 extends linearly in the left-to-right direction DR3. The discharge wall 52 forms the discharge passage 54 that is configured to discharge the air toward the air conditioning unit of the vehicle air conditioning apparatus (not shown). Therefore, the air, which flows at the inside of the scroll casing 50 is introduced into the air conditioning unit.

Although not shown, the air conditioning unit adjusts the temperature of the air, which is introduced from the centrifugal blower 1, to a desired temperature, and the air conditioning unit discharges the temperature-adjusted air into the vehicle cabin. The air conditioning unit is configured to adjust the temperature of the air, which is introduced from the centrifugal blower 1, to the desired temperature by a heat exchanger, such as an evaporator or a heater core.

The scroll casing 50 has the suction port forming portion 55 that forms a suction port 61 for supplying the air to the fan 30 and is formed at the one side of the scroll casing 50 in the axial direction of the fan 30. The suction port forming portion 55 forms an upper wall of the scroll casing 50. The suction port forming portion 55 has the suction port 61 which is shaped in a circle centered on the fan axis CL. A bell mouth 60, which is shaped in a circular ring form, is formed at a periphery of the suction port 61 of the suction port forming portion 55. In other words, an inner surface of the bell mouth 60 forms the suction port 61.

A cross-section of the bell mouth 60 is shaped generally in an arcuate form so that the air can smoothly flow through the suction port 61. Specifically, the bell mouth 60 has a trumpet shape where a diameter progressively decreases from the one side to the other side in the axial direction. An innermost perimeter (a radially inner end part) 63 of the bell mouth 60 is positioned adjacent to the fan 30, and an outermost perimeter (a radially outer end part) 64 of the bell mouth 60 is spaced from the fan 30. The bell mouth 60 is placed above the primary blades 31 and covers a top of the respective primary blades 31. Therefore, the air, which has passed through the filter 20, is suctioned into the fan 30 through the bell mouth 60.

Figure 3:
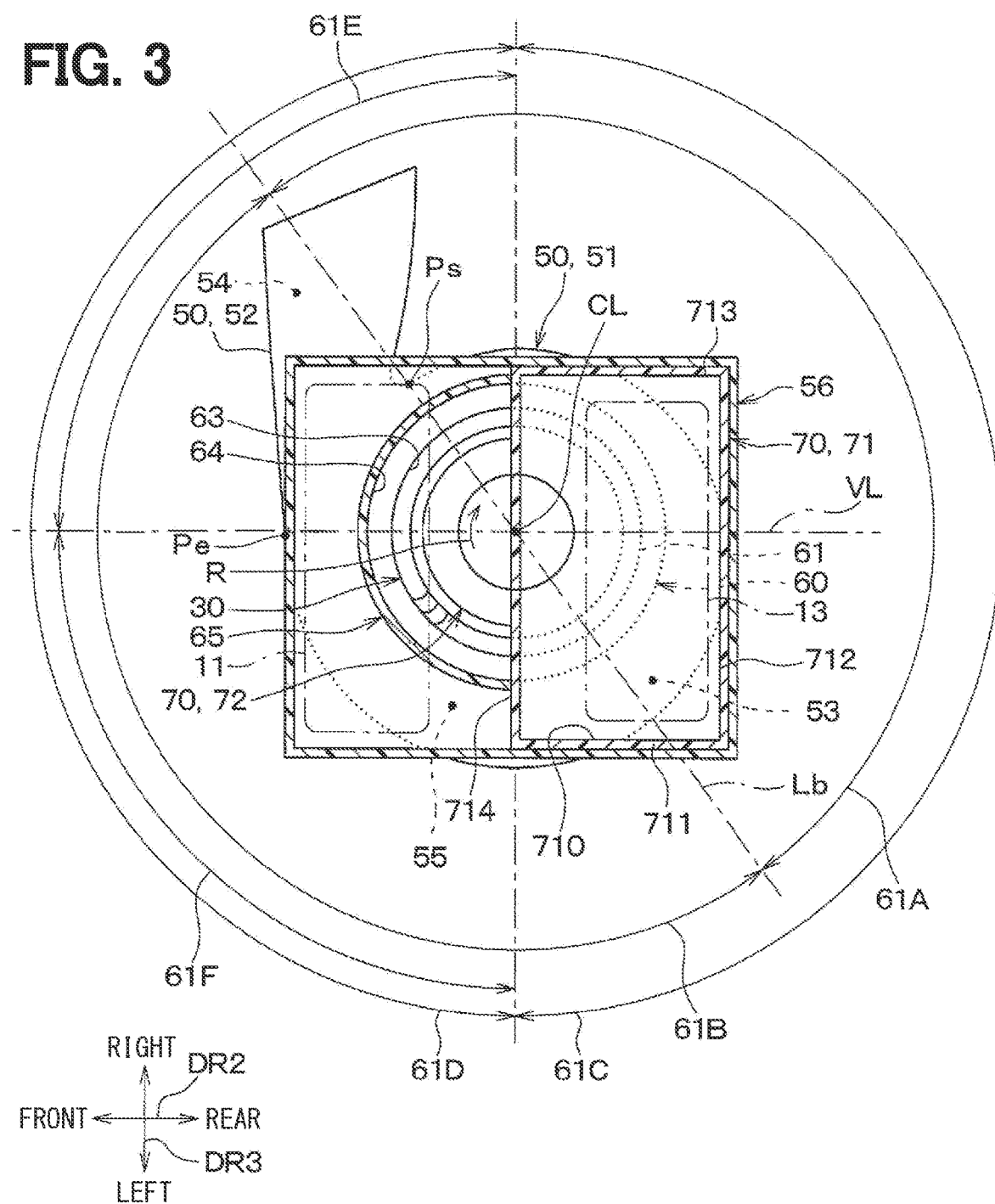
FIG. 3 is a cross-sectional view taken along line III-Ill in FIG. 1.

Here, in the present embodiment, as shown in FIG. 3, a region of the periphery of the suction port 61, which guides the air to an upstream section of the air passage 53, is defined as a first half region 61A, and another region of the periphery of the suction port 61, which guides the air to a downstream section of the air passage 53, is defined as a later half region 61B. In a case where the suction port 61 is divided into two regions by the reference line Lb, the first half region 61A is one of the two regions which is closer to the upstream section of the air passage 53 than the other one of the two regions. Also, in this case where the suction port 61 is divided into the two regions by the reference line Lb, the later half region 61B is the other one of the two regions which is closer to the downstream section of the air passage 53 than the one of the two regions.

Furthermore, in the present embodiment, a region of the periphery of the suction port 61, which overlaps with a tube upper end portion 71 of the separation tube 70 in the axial direction, is defined as an overlapping region 61C, and another region of the periphery of the suction port 61, which does not overlap with the tube upper end portion 71 in the axial direction, is defined as a non-overlapping region 61D. The overlapping region 61C of this instance overlaps more with the first half region 61A than the later half region 61B. Furthermore, the non-overlapping region 61D of this instance overlaps more with the later half region 61B than the first half region 61A.

Furthermore, in a case where the non-overlapping region 61D is divided into two regions by an imaginary line VL that extends through the fan axis CL and is perpendicular to the tube outer periphery 714, one of the two regions, which is closer to the nose Ps than the other one of the two regions, is defined as a first region 61E, and the other one of the two regions, which is farther from the nose Ps than the one of the two regions, is defined as a second region 61F.

Referring back to FIG. 1, the suction port forming portion 55 of the scroll casing 50 has a mount frame 56, to which the inside/outside air box 10 and the filter 20 are mounted, at a location that is on the radially outer side of the bell mouth 60. The inside/outside air box 10 and the filter 20 are mounted to the mount frame 56.

A partition 57, which partitions the air passage 53 and the discharge passage 54 into a first air passage 531 and a second air passage 532, is provided at the inside of the scroll casing 50. The partition 57 is formed at a location that corresponds to the separation plate 35 of the fan 30. The partition 57 is formed such that the partition 57 overlaps with, for example, the separation plate 35 in the radial direction of the fan 30. Therefore, the air, which passes through the primary inter-blade passages 310 of the fan 30, flows into the first air passage 531. Furthermore, the air, which passes through the secondary inter-blade passages 320 of the fan 30, flows into the second air passage 532.

The first air passage 531 is defined by a first outer peripheral wall portion 511 of the outer peripheral wall 51. The first outer peripheral wall portion 511 is an upper portion of the outer peripheral wall 51 which overlaps with the primary blades 31 in the radial direction. The second air passage 532 is defined by a second outer peripheral wall portion 512 of the outer peripheral wall 51. The second outer peripheral wall portion 512 is a lower portion of the outer peripheral wall 51 which overlaps with the secondary blades 32 in the radial direction.

At least a portion of the separation tube 70 is placed on the inner side of the fan 30, and the separation tube 70 is configured to separately guide the outside air and the inside air to the fan 30 in a state where the outside air and the inside air are located at the inside and the outside, respectively, of the separation tube 70. The separation tube 70 is a tubular member and extends in the axial direction of the fan 30. The separation tube 70 opens at two opposite ends of the separation tube 70 which are opposite to each other in the axial direction. The air, which passes through the suction port 61, is separated into the inner air, which flows through the inside of the separation tube 70, and the outer air, which flows through the outside of the separation tube 70. The separation tube 70 has the tube upper end portion 71 and a tubular portion 72. The tube upper end portion 71 is shaped in a plate form and is located between the bell mouth 60 and the inside/outside air box 10. The tubular portion 72 is shaped in a tubular form and is connected to the tube upper end portion 71.

The tube upper end portion 71 has an air inlet 710, through which the air is introduced into an inside of the tubular portion 72. The air inlet 710 opens on the lower side of the second introduction space 102 of the inside/outside air box 10 such that the air, which is introduced into the second introduction space 102 of the inside/outside air box 10, flows into the air inlet 710.

As shown in FIG. 3, the tube upper end portion 71 is shaped generally in a rectangular form in a plan view seen from the one side in the axial direction. The tube upper end portion 71 is positioned to overlap with a portion of the periphery of the suction port 61 in the axial direction. The tube upper end portion 71 is placed at a location where an overlapping area of the tube upper end portion 71, which overlaps with the first half region 61A of the suction port 61 in the axial direction, is larger than another overlapping area of the tube upper end portion 71, which overlaps with the later half region 61B of the suction port 61 in the axial direction. In other words, the tube upper end portion 71 axially overlaps more with the first half region 61A than the later half region 61B. The tube upper end portion 71 of the present embodiment is located at a position where the tube upper end portion 71 covers substantially half of the suction port 61 and the bell mouth 60.

Specifically, the tube upper end portion 71 is located at the position where the tube upper end portion 71 does not overlap with the nose Ps and the winding end Pe in the axial direction. Therefore, the non-overlapping region 61D of the periphery of the suction port 61, which does not overlap with the tube upper end portion 71, includes a portion that overlaps with the nose Ps and the winding end Pe in the radial direction.

The tube upper end portion 71 has three support peripheries 711, 712, 713 and a tube outer periphery 714. The support peripheries 711, 712, 713 are supported by the mount frame 56 of the scroll casing 50, and the tube outer periphery 714 overlaps with the suction port 61 in the axial direction. The three support peripheries 711, 712, 713 are shaped to correspond with the inner surface of the mount frame 56 such that the support peripheries 711, 712, 713 contact the inner surface of the mount frame 56 without forming a gap therebetween. The three support peripheries 711, 712, 713 do not overlap with the suction port 61 in the axial direction.

The tube upper end portion 71 is placed such that the tube outer periphery 714 of the tube upper end portion 71 passes through the fan axis CL and extends across the suction port 61 in the left-to-right direction DR3. The tube outer periphery 714 of the present embodiment extends in a linear form in the left-to-right direction DR3. Therefore, the overlapping region 61C becomes a front region of the periphery of the suction port 61 in the front-to-rear direction DR2. Furthermore, the non-overlapping region 61D becomes a rear region of the periphery of the suction port 61 in the front-to-rear direction DR2.

The tubular portion 72 is connected to the tube upper end portion 71. An upper portion 721 of the tubular portion 72, which is connected to the tube upper end portion 71, is sloped in the axial direction, and a lower portion 722 of the tubular portion 72, which is located on the inner side of the scroll casing 50, extends in the up-to-down direction along the fan axis CL. The tubular portion 72 may be formed such that each of the upper portion 721 and the lower portion 722 is sloped in the axial direction.

The tubular portion 72 is sloped relative to the axial direction such that a center of a lower end of the upper portion 721, which is connected to the tube upper end portion 71, intersects the fan axis CL. Furthermore, the lower portion 722 of the tubular portion 72 is shaped to progressively expand in the radial direction toward the other side in the axial direction.

A lower end of the lower portion 722 is located at a position that corresponds to the separation plate 35 of the fan 30. The lower end of the lower portion 722 is formed such that the lower end of the lower portion 722 overlaps with, for example, the separation plate 35 in the radial direction of the fan 30. In this way, the inner air, which flows through the inside of the separation tube 70, flows into the secondary inter-blade passages 320 of the fan 30. Furthermore, the inside air, which flows through the outside of the separation tube 70, flows into the primary inter-blade passages 310 of the fan 30.

Here, in a case where substantially half of the suction port 61 is covered by the tube upper end portion 71, the air, which passes through the outside of the separation tube 70 without passing through the air inlet 710 of the tube upper end portion 71, is likely to concentrate and flow through the non-overlapping region 61D of the suction port 61, which is not covered by the tube upper end portion 71. In such a centrifugal blower 1, the flow velocity of the air, which passes through the suction port 61, is increased, so that noise is likely to be generated due to collision of the air to the fan 30 and/or the scroll casing 50. This is the matter found after diligent studies by the inventors of the present application.

In consideration of the above points, as shown in FIG. 3, the suction port forming portion 55 has the rib 65 that is formed at the periphery of the suction port 61 and projects toward the one side in the axial direction. The rib 65 is formed integrally with the suction port forming portion 55 in one-piece. However, the rib 65 and the suction port forming portion 55 may be formed as separate components depending on a need.

The rib 65 extends in an arcuate form that is centered on the fan axis CL. The rib 65 is formed in a range that is from an innermost perimeter 63 to an outermost perimeter 64 of the bell mouth 60 such that at least a portion of the rib 65 overlaps with the bell mouth 60 in the axial direction.

The rib 65 of this instance is formed at the outermost perimeter 64 of the bell mouth 60. Specifically, the rib 65 is formed at the outermost perimeter 64 of the bell mouth 60 such that a radially inner wall surface of the rib 65 overlaps with the outermost perimeter 64 of the bell mouth 60 in the axial direction. Here, it should be noted that a radially outer wall surface of the rib 65 of this instance is located on the radially outer side of the bell mouth 60.

The suction port forming portion 55 may possibly have a groove at a connection between the suction port forming portion 55 and the outermost perimeter 64 of the bell mouth 60 in conformity with a change in a passage cross-sectional area of the air passage 53 of the scroll casing 50. In this case, as long as at least the portion of the rib 65 overlaps with the bell mouth 60 in the axial direction, the rib 65 may be arranged such that the radially outer wall surface of the rib 65 is flush with the groove located on the outer side of the outermost perimeter 64.

Among the overlapping region 61C and the non-overlapping region 61D of the periphery of the suction port 61, the rib 65 occupies more area in the non-overlapping region 61D than in the overlapping region 61C. In other words, a circumferential range, in which the rib 65 is formed, is wider in the overlapping region 61C than in the non-overlapping region 61D. In the present embodiment, at the periphery of the suction port 61, the rib 65 is formed to extend along the entire extent of the non-overlapping region 61D and is not formed in the overlapping region 61C. More specifically, the rib 65 is formed in the non-overlapping region 61D such that the rib 65 extends through both the first region 61E and the second region 61F without unequally occupying the first region 61E and the second region 61F.

Figure 4:
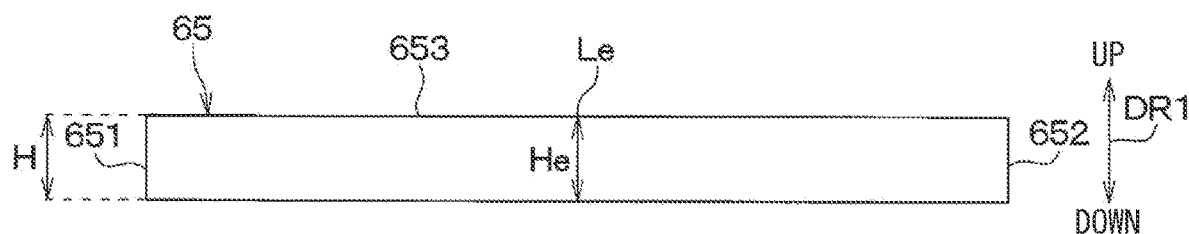
FIG. 4 is a schematic view showing a geometric net of a rib provided in the centrifugal blower of the first embodiment.

The rib 65 projects from the suction port forming portion 55 toward the filter 20 in the axial direction. A geometric net of the rib 65, which is obtained when a three-dimensional figure of the rib 65 is laid out flat, is generally a rectangle, as shown in FIG. 4. Specifically, a height H of the rib 65 measured in the axial direction is constant from one of two rib ends 651, 652, which are two circumferential ends of the rib 65, to the other one of the two rib ends 651, 652. Therefore, a height He of the rib 65 of the present embodiment measured in the axial direction at a position Le, which overlaps with the winding end Pe in the radial direction, is the same as the height H of the rest of the rib 65.

Here, the expression of "the height is constant" does not mean only a state in which the height does not change in a strict sense, but also includes a state in which the height slightly changes due to a manufacturing error or the like. The state, in which there is a slight change in the height, can be interpreted as, for example, a state in which the height dimension is within a range of ±5% of the designed height.

The height H of the rib 65 measured in the axial direction is set to a predetermined value (for example, 20 mm) or more so that the air, which has passed through the filter 20, does not easily get over the rib 65. The height H of the rib 65 measured in the axial direction is larger than a width Wb of the bell mouth 60 measured in the radial direction.

The height H of the rib 65 measured in the axial direction is set to a value that limits contact of a distal end 653 of the rib 65 to the filter 20. Specifically, the height H of the rib 65 measured in the axial direction is smaller than the size of the predetermined gap G1 between the filter 20 and the suction port forming portion 55 and is larger than a size of a gap G2 between the filter 20 and the distal end 653 of the rib 65 in the axial direction (i.e., G2<H<G1). It is desirable that the height H of the rib 65 measured in the axial direction is set to be equal to or larger than 80% of the size of the predetermined gap G1 between the filter 20 and the suction port forming portion 55.

Next, an operation of the centrifugal blower 1 will be described. The centrifugal blower 1 has three air suction modes, which include an outside air mode, in which the outside air is suctioned, an inside air mode, in which the inside air is suctioned, and an inside/outside air mode, in which the outside air and the inside air are separately and simultaneously suctioned.

The outside air mode is a mode for introducing the outside air into the inside of the inside/outside air box 10. The centrifugal blower 1 is configured such that, at the time of operating in the outside air mode, the first inside/outside air door 14 is placed at a position, at which the first inside/outside air door 14 opens the outside-air inlet 11, and the second inside/outside air door 15 is placed at a position, at which the second inside/outside air door 15 opens the communication passage 103.

The inside air mode is a mode for introducing only the inside air into the inside of the inside/outside air box 10. The centrifugal blower 1 is configured such that, at the time of operating in the inside air mode, the first inside/outside air door 14 is placed at a position, at which the first inside/outside air door 14 opens the first inside-air inlet 12, and the second inside/outside air door 15 is placed at a position, at which the second inside/outside air door 15 opens the second inside-air inlet 13.

The inside/outside air mode is a mode for introducing the outside air and the inside air into the inside of the inside/outside air box 10. The centrifugal blower 1 is configured such that, at the time of operating in the inside/outside air mode, the first inside/outside air door 14 is placed at the position, at which the first inside/outside air door 14 opens the outside-air inlet 11, and the second inside/outside air door 15 is placed at the position, at which the second inside/outside air door 15 opens the second inside-air inlet 13.

Figure 5:
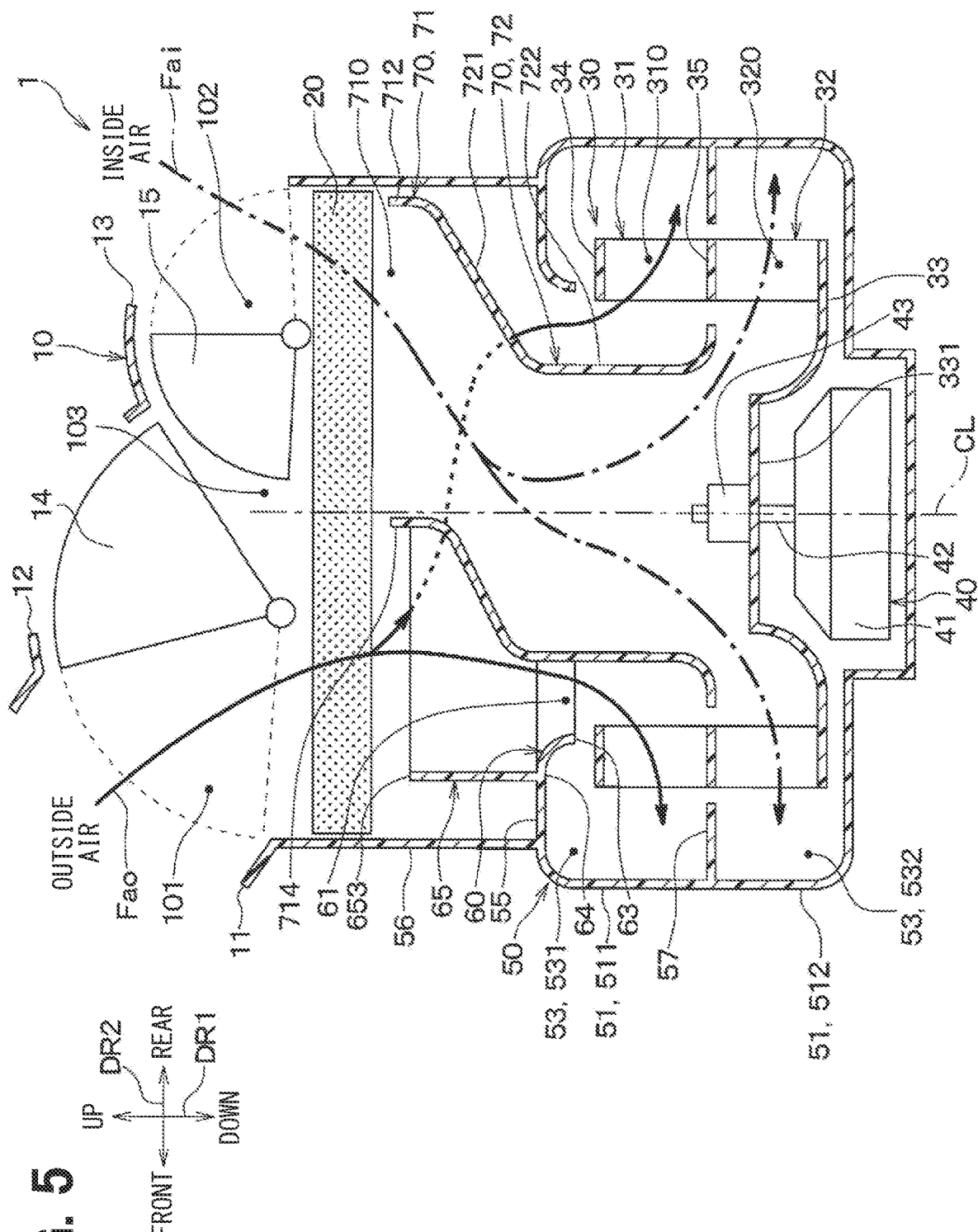
FIG. 5 is a schematic axial cross-sectional view for describing a flow of the air in the centrifugal blower of the first embodiment.

When the fan 30 is rotated by the electric motor 40 in the inside/outside air mode, in the centrifugal blower 1, as shown in FIG. 5, the outside air is introduced from the outside-air inlet 11 into the first introduction space 101, and the inside air is introduced from the second inside-air inlet 13 into the second introduction space 102.

The inside air, which is introduced into the second introduction space 102, is suctioned into the secondary inter-blade passages 320 of the fan 30 through the inside of the separation tube 70, as indicated by a dot-dash line arrow Fai in FIG. 5. The inside air, which is suctioned into the secondary inter-blade passages 320, is discharged into the second air passage 532.

In contrast, the outside air, which is introduced into the first introduction space 101, is suctioned into the primary inter-blade passages 310 of the fan 30 through the outside of the separation tube 70, as indicated by a solid line arrow Fao in FIG. 5. The outside air, which is suctioned into the primary inter-blade passages 310, is discharged into the first air passage 531.

Although not depicted in the drawings, the outside air, which flows in the first air passage 531, and the inside air, which flows in the second air passage 532, are introduced from the scroll casing 50 into the air conditioning unit and are mixed and adjusted to have a predetermined temperature at the inside of the air conditioning unit, and this temperature adjusted air is discharged from different discharge outlets of the air conditioning unit into the vehicle cabin.

Here, when the flow velocity of the air, which passes through the suction port 61, is high, this air and the primary blades 31 of the fan 30 collide in a complicated manner, so that an abnormal noise called an NZ sound is likely to be generated. The NZ sound is a sound having a specific frequency generated according to the rotational speed N of the fan 30 and the number Z of the primary blades 31. The NZ sound is also called a siren sound.

With respect to this, the centrifugal blower 1 of the present embodiment has the rib 65 which occupies more area in the non-overlapping region 61D than in the overlapping region 61C at the periphery of the suction port 61. With this arrangement, it is possible limit the concentrated flow of the air in the non-overlapping region 61D of the suction port 61, which is not covered with the tube upper end portion 71, and thereby the flow velocity of the air, which passes through the suction port 61, is unlikely to become high. Therefore, the centrifugal blower 1 of the present embodiment can limit the generation of the noise since the NZ sound, which is caused by the collision of the air against the fan 30, is less likely to be generated.

Figure 6:
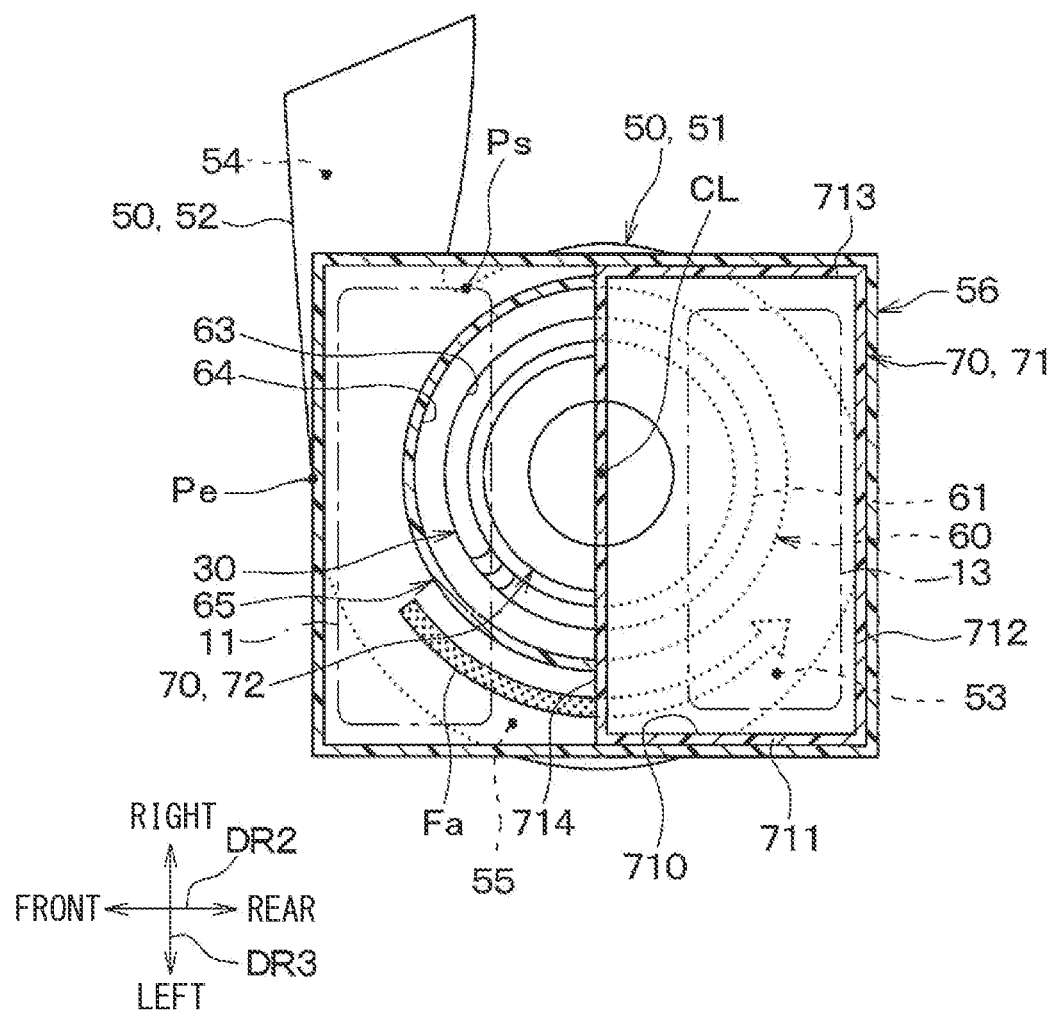
FIG. 6 is a schematic radial cross-sectional view for describing the flow of the air in the centrifugal blower of the first embodiment.

Here, the air, which flows at the outside of the rib 65, flows into the overlapping region 61C along the rib 65, as indicated by, for example, an arrow Fa in FIG. 6. Specifically, the rib 65 functions as an air guide that guides the air, which flows at the outside of the rib 65, into the overlapping region 61C. Therefore, in the centrifugal blower 1, the rib 65 not only limits the flow of the air to the non-overlapping region 61D but also facilitates the flow of the air to the overlapping region 61C which is covered by the tube upper end portion 71. According to this, the fan efficiency can be improved by increasing the flow rate of the air to the overlapping region 61C.

As described above, in the centrifugal blower 1 of the present embodiment, since the rib 65 is arranged such that the rib 65 occupies more area in the non-overlapping region 61D of the suction port 61, which is not covered with the tube upper end portion 71, than in the overlapping region 61C, it is possible to limit the concentrated flow of the air in the non-overlapping region 61D. According to this, the collision of the air, which is suctioned from the non-overlapping region 61D, against the fan 30 is limited, and thereby the generation of the noise can be limited.

Furthermore, in the centrifugal blower 1 of the present embodiment, the flow of the air to the overlapping region 61C, which is covered by the tube upper end portion 71, is facilitated by limiting the flow of the air to the non-overlapping region 61D by the rib 65, and thereby the fan efficiency can be improved.

Thus, according to the centrifugal blower 1 of the present embodiment, the generation of the noise, which is caused by the air flow rate distribution around the suction port 61, is limited, and at the same time, the fan efficiency can be improved by the increase in the flow rate of the air to the overlapping region 61C.

Here, the tube upper end portion 71 is placed at the position where the overlapping area of the tube upper end portion 71, which axially overlaps with the first half region 61A that guides the air to the upstream section of the air passage 53, is larger than the overlapping area of the tube upper end portion 71, which axially overlaps with the later half region 61B that guides the air to the downstream section of the air passage 53.

With this configuration, the amount of the air suctioned at the later half region 61B, which guides the air to the downstream section of the air passage 53 having the increased passage cross-sectional area, tends to be increased in comparison to the first half region 61A. Furthermore, in the case where the overlapping area of the first half region 61A, which overlaps with the tube upper end portion 71, is larger than the overlapping area of the later half region 61B, which overlaps with the tube upper end portion 71, the air will flow more intensively into the later half region 61B, which overlaps with the tube upper end portion 71 in the axial direction.

Therefore, in the blower having the above-described structure, when the rib 65 is arranged such that the rib 65 occupies more area in the non-overlapping region 61D, which does not overlap with the tube upper end portion 71, than in the overlapping region 61C, it is possible to limit the concentrated flow of the air in the later half region 61B. As a result, the flow velocity of the air, which passes through the suction port 61, is unlikely to become high, so that it is possible to limit the generation of the noise of the centrifugal blower 1.

Specifically, the rib 65 is formed in the range that is from the innermost perimeter 63 to the outermost perimeter 64 of the bell mouth 60 such that at least the portion of the rib 65 overlaps with the bell mouth 60 in the axial direction. According to this arrangement, since the rib 65 is present in the non-overlapping region 61D, it is difficult for the air to flow toward the fan 30 along the bell mouth 60. Thus, it is possible to sufficiently limit the concentrated flow of the air in the non-overlapping region 61D.

Furthermore, the maximum height of the rib 65 measured in the axial direction is larger than the width Wb of the bell mouth 60 measured in the radial direction. More specifically, the maximum height of the rib 65 measured in the axial direction is smaller than the size of the predetermined gap G1 between the filter 20 and the suction port forming portion 55 and is larger than the size of the gap G2 between the filter 20 and the distal end 653 of the rib 65 in the axial direction. According to this arrangement, it is possible to reduce the flow of the air, which overflows the rib 65, so that it is possible to sufficiently limit the concentrated flow of the air to the non-overlapping region 61D.

Particularly, the height H of the rib 65, which is measured in the axial direction at the position Le that overlaps with the winding end Pe in the radial direction, is equal to or larger than the height of the rest of the rib 65 measured in the axial direction. When the height H of the rib 65 measured in the axial direction is maximized at the position Le that overlaps with the winding end Pe, the amount of the suctioned air can be limited at this position, at which the passage cross-sectional area is relatively large in the air passage 53 and at which the flow of the air toward the fan 30 is likely to be concentrated.

(Modification of First Embodiment)

In the embodiment described above, there is described the example where the rib 65 is formed along the entire extent of the non-overlapping region 61D. However, the location of the rib 65 is not limited to this. For example, the rib 65 may be formed only at a portion of the non-overlapping region 61D. In such a case, it is desirable that the rib 65 is formed in the non-overlapping region 61D at the position Le that overlaps with the winding end Pe in the radial direction. This is because the air is most likely to concentrate in the vicinity of the winding end Pe in the radial direction in the non-overlapping region 61D.

Second Embodiment

Next, the second embodiment will be described with reference to FIGS. 7 and 8. In this embodiment, portions, which are different from the first embodiment, will be mainly described.

Figure 7:
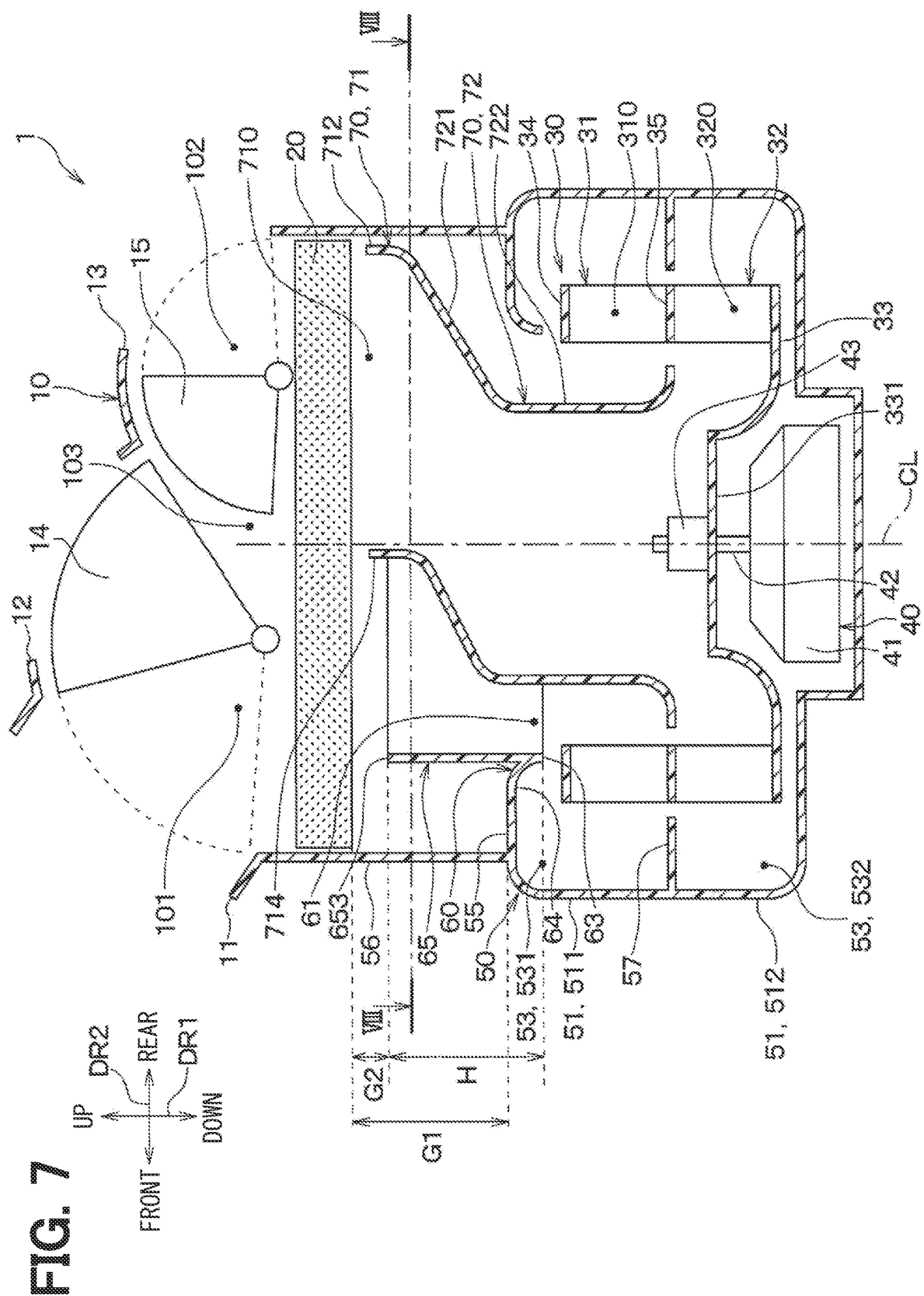
FIG. 7 is a schematic axial cross-sectional view of a centrifugal blower according to a second embodiment.
Figure 8:
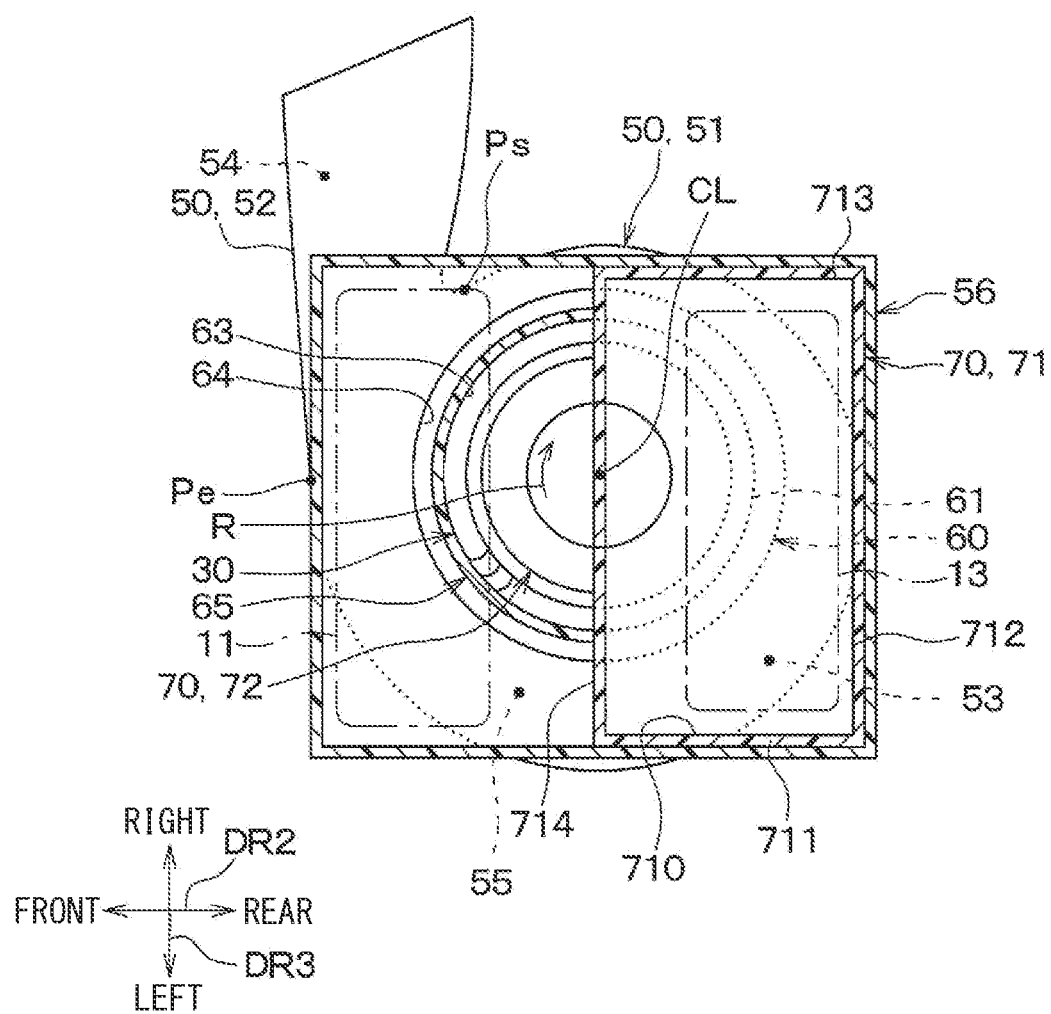
FIG. 8 is a cross-sectional view taken along line VIII-VIII in FIG. 7.

As shown in FIGS. 7 and 8, the rib 65 of the present embodiment is formed at the innermost perimeter 63 of the bell mouth 60 such that at least a portion of the rib 65 overlaps with the bell mouth 60 in the axial direction.

Specifically, the rib 65 is formed at the innermost perimeter 63 of the bell mouth 60 such that a radially inner wall surface of the rib 65 overlaps with the innermost perimeter 63 of the bell mouth 60 in the axial direction. With this arrangement, the suction port 61 is formed at a root of the rib 65.

The rest of the structure is the same as that of the first embodiment. The centrifugal blower 1 of the present embodiment can achieve the actions and the advantages, which can be obtained from the structure that is the same as or equivalent to the structure of the first embodiment.

(Modification of Second Embodiment)

In the second embodiment described above, there is described the example where the rib 65 is formed at the innermost perimeter 63 of the bell mouth 60. However, the position of the rib 65 is not limited to this. For example, the rib 65 may be located at a position, which is on the radially outer side of the innermost perimeter 63 of the bell mouth 60 and is on the radially inner side of the outermost perimeter 64 of the bell mouth 60.

Third Embodiment

Next, the third embodiment will be described with reference to FIG. 9. In this embodiment, portions, which are different from the first embodiment, will be mainly described.

Figure 9:
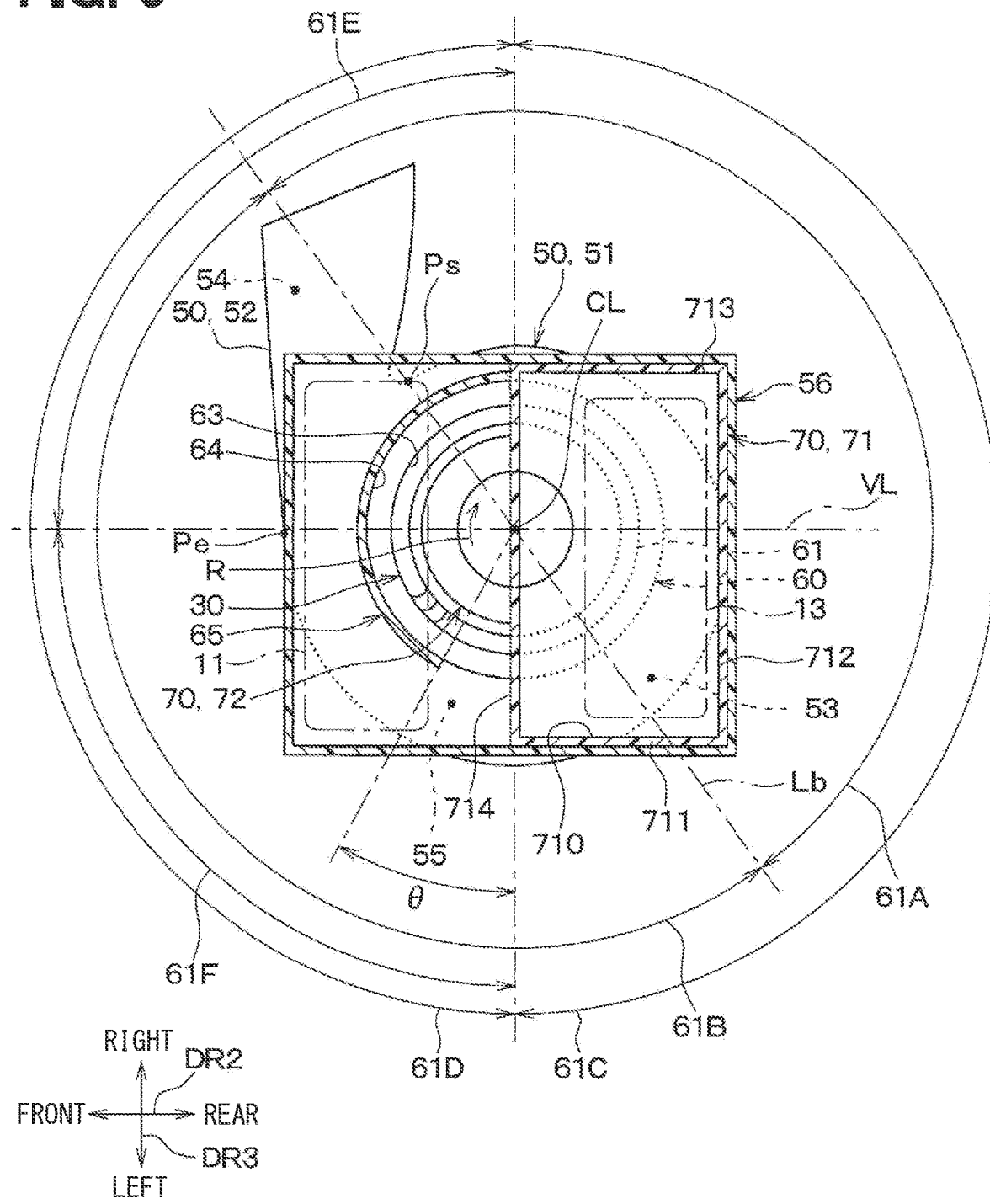
FIG. 9 is a schematic radial cross-sectional view of a centrifugal blower according to a third embodiment.

As shown in FIG. 9, the rib 65 of the present embodiment is formed only at a portion of the non-overlapping region 61D of the periphery of the suction port 61 rather than along the entire extent of the non-overlapping region 61D. The rib 65 occupies more area in the first region 61E than in the second region 61F in the non-overlapping region 61D. In other words, a circumferential extent of the rib 65 in the first region 61E is larger than a circumferential extent of the rib 65 in the second region 61F.

More specifically, the rib 65 circumferentially extends through the entire circumferential extent of the first region 61E and further circumferentially extends from an intersecting position of the second region 61F, which intersects the imaginary line VL, to a position of the second region 61F that is before an overlapping position, at which the second region 61F overlaps with the tube outer periphery 714. In other words, the rib 65 is not formed in a range that is from the overlapping position of the second region 61F, which overlaps with the tube outer periphery 714, to a position which is advanced from the overlapping position toward the imaginary line VL by a predetermined angle θ in the rotational direction R. Specifically, the rib 65 is not in a region of the second region 61F which is adjacent to the tube outer periphery 714.

Here, it is desirable that the predetermined angle θ is set in view of the NZ sound and the fan efficiency. For example, when it is desirable to sufficiently limit the NZ sound, it is desirable to set the predetermined angle θ to a relatively small angle (e.g., an angle that is equal to or smaller than 15 degrees). In contrast, when it is desirable to sufficiently improve the fan efficiency, it is desirable to set the predetermined angle θ to a relatively large angle (e.g., an angle that is equal to or larger than 20 degrees). In order to reduce noise and improve the fan efficiency, it is desirable to set the predetermined angle θ in the range of, for example, 10 to 30 degrees.

The rest of the structure is the same as that of the first embodiment. The centrifugal blower 1 of the present embodiment can achieve the actions and the advantages, which can be obtained from the structure that is the same as or equivalent to the structure of the first embodiment.

The rib 65 of the present embodiment is arranged such that the rib 65 occupies more area in the first region 61E than in the second region 61F in the non-overlapping region 61D. According to this, it is possible to limit the amount of the suctioned air in the vicinity of the nose Ps where the flow of the air, which flows into the fan 30, tends to be largely disturbed, and it is possible to ensure a certain amount of the suctioned air at a position spaced from the nose Ps. Therefore, it is possible to limit a decrease in the fan efficiency caused by the insufficient amount of the suctioned air while limiting the generation of the noise.

Specifically, the rib 65 is not formed in the range that is from the overlapping position of the second region 61F, which overlaps with the tube outer periphery 714, to the position which is advanced from the overlapping position toward the imaginary line VL by the predetermined angle θ in the rotational direction R. As described above, when the rib 65 is not formed in the range of the second region 61F, which is adjacent to the tube outer periphery 714, it is possible to ensure the certain amount of the suctioned air at the position which is adjacent to the overlapping region 61C in the second region 61F. Thereby, it is possible to limit a decrease in the fan efficiency caused by the shortage in the amount of the suctioned air.

(Modification of Third Embodiment)

In the embodiment described above, there is described the example where the rib 65 is formed along the entire extent of the first region 61E. However, the location of the rib 65 is not limited to this. The rib 65 may be formed only at a portion of the first region 61E. Even in such a case, it is desirable that the rib 65 is formed in the first region 61E at the position Le that overlaps with the winding end Pe in the radial direction. This is because the air is most likely to concentrate in the vicinity of the winding end Pe in the radial direction in the first region 61E.

Fourth Embodiment

Figure 11:
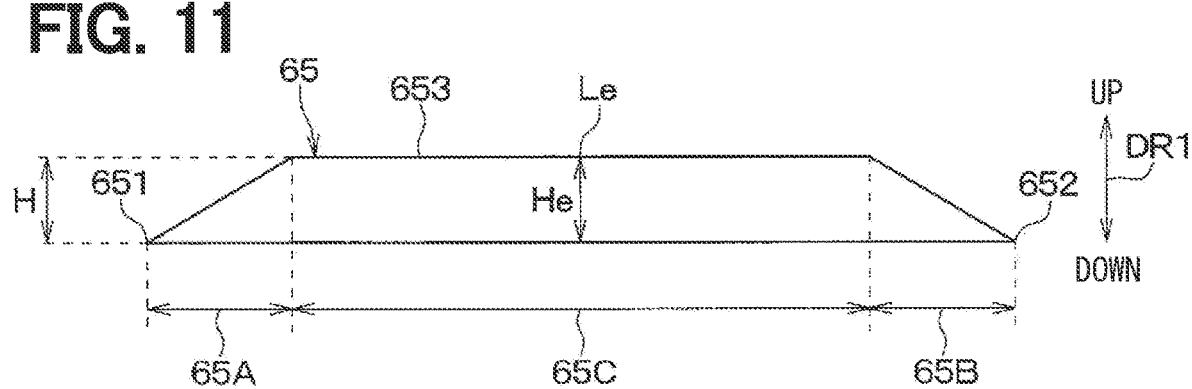
FIG. 11 is a schematic view showing a geometric net of a rib provided in the centrifugal blower of the fourth embodiment.
Figure 12:
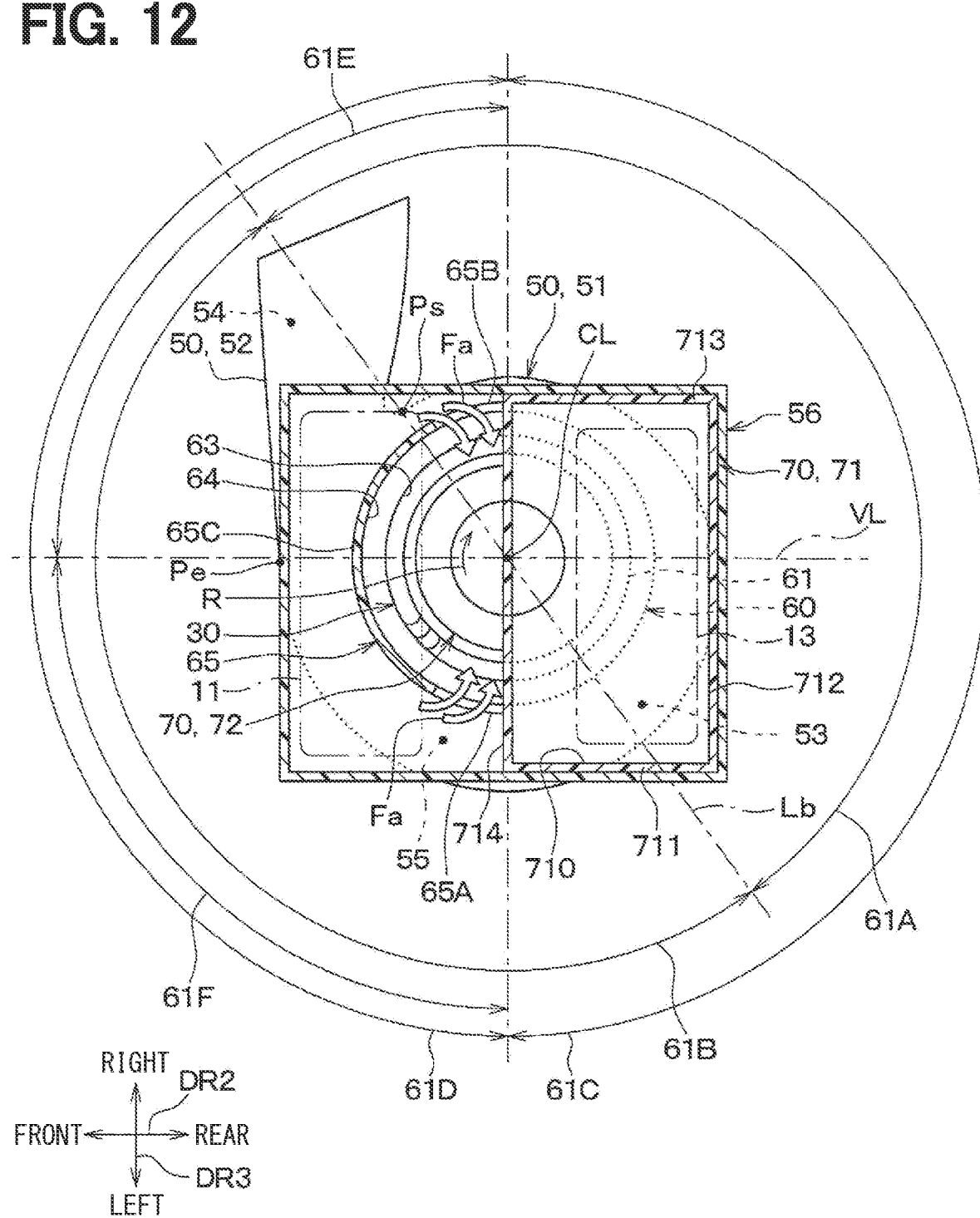
FIG. 12 is a cross-sectional view taken along line XII-XII in FIG. 10.

Next, the fourth embodiment will be described with reference to FIGS. 10 to 12. In this embodiment, portions, which are different from the first embodiment, will be mainly described.

Figure 10:
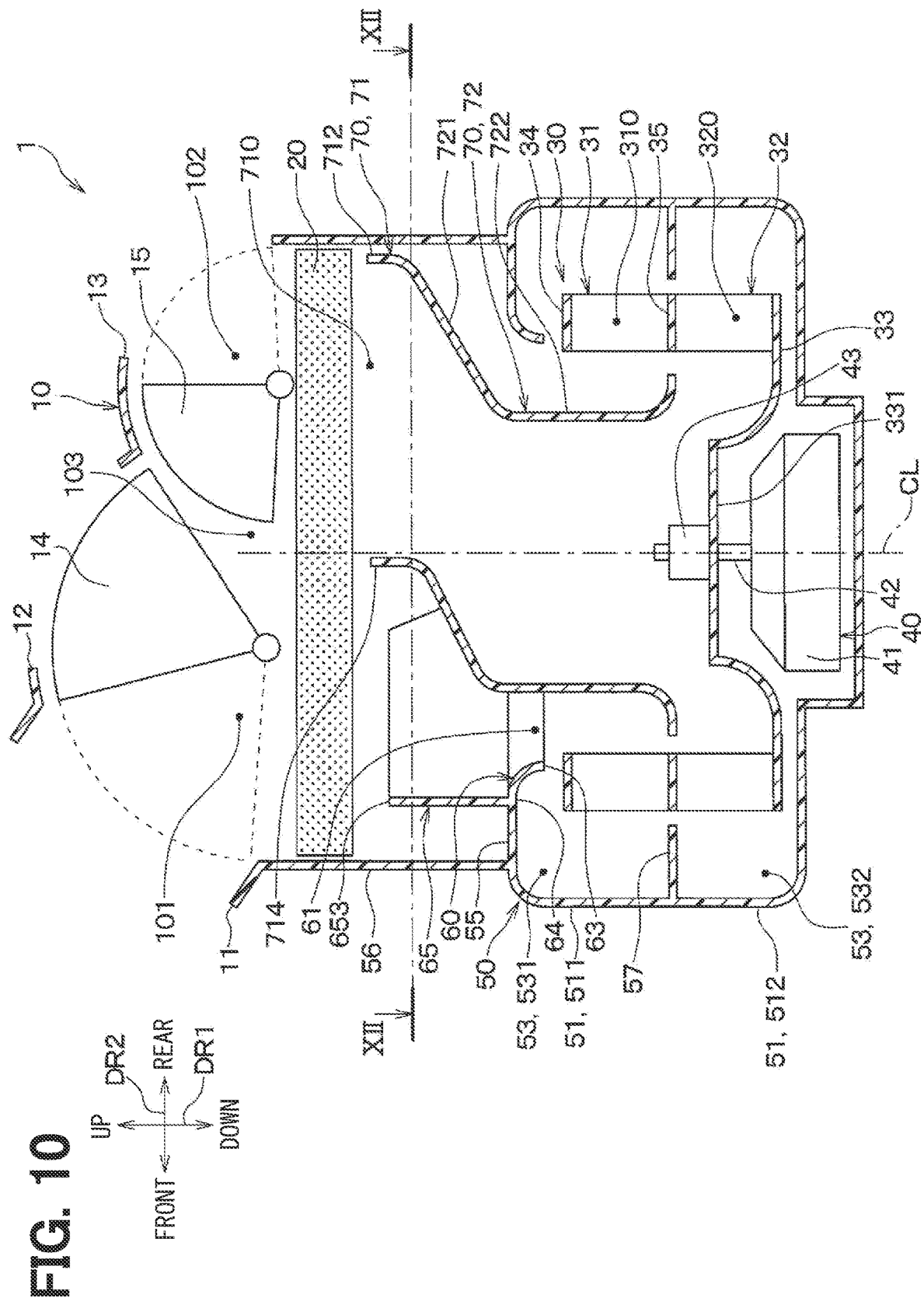
FIG. 10 is a schematic axial cross-sectional view of a centrifugal blower according to a fourth embodiment.

The rib 65 of the present embodiment has the height H that is measured in the axial direction and changes in the circumferential direction, as shown in FIG. 10. As shown in FIG. 11, the height of the rib 65 is minimized at each of the two rib ends 651, 652, which are the two circumferential ends of the rib 65, and the height of the rib 65 is progressively decreased toward each of the two rib ends 651, 652.

Specifically, the rib 65 has two end portions 65A, 65B that respectively have the two rib ends 651, 652, and each of the two end portions 65A, 65B is formed such that the height H of the end portion 65A, 65B measured in the axial direction is progressively increased from the rib end 651, 652 in a direction away from the rib end 651, 652 at the end portion 65A, 65B. A circumferential length of each of the end portions 65A, 65B is, for example, about 10 to 20% of the entire circumferential length of the rib 65.

In the rib 65 of this instance, each of the end portions 65A, 65B, which respectively have the two rib ends 651, 652, is linearly sloped along a line that extends in a direction which crosses the axial direction. A remaining portion 65C of the rib 65 of this instance, which is other than the end portions 65A, 65B, has the height H which is measured in the axial direction and is constant regardless of a distance from the rib end 651, 652.

Here, the portion 65C of the rib 65, which is other than the end portions 65A, 65B, has the position Le which overlaps with the winding end Pe in the radial direction. Therefore, the height He of the rib 65 of the present embodiment measured in the axial direction at the position Le, which overlaps with the winding end Pe in the radial direction, is the same as the height H of the rest of the remaining portion 65C of the rib 65.

The rest of the structure is the same as that of the first embodiment. The centrifugal blower 1 of the present embodiment can achieve the actions and the advantages, which can be obtained from the structure that is the same as or equivalent to the structure of the first embodiment.

The rib 65 of the present embodiment is formed such that the height H measured in the axial direction is progressively decreased toward each of the rib ends 651, 652. Thereby, the air, which flows along the rib 65 at the outside of the rib 65, can be more easily suctioned into the fan 30 by flowing beyond the rib 65 as the flow of the air approaches the rib end 651, 652, as indicated by arrows Fa in FIG. 12. As a result, the air, which flows in the circumferential direction along the rib 65, enters the fan 30 at entry points which are circumferentially dispersed. Thus, it is possible to limit the concentration of the entry points of the air, which flows in the circumferential direction along the rib 65 and enters the fan 30, at the rib ends 651, 652. Thereby, it is possible to limit the generation of the noise near the rib ends 651, 652.

Specifically, each of the two end portions 65A, 65B of the rib 65, which respectively have the two rib ends 651, 652, is formed such that the height H of the end portion 65A, 65B measured in the axial direction is progressively increased from the rib end 651, 652 in the direction away from the rib end 651, 652 at the end portion 65A, 65B. In addition, the remaining portion 65C of the rib 65, which is other than the end portions 65A, 65B, has the height H which is measured in the axial direction and is constant regardless of the distance from the rib end 651, 652. Thereby, the amount of the suctioned air, which is suctioned from the non-overlapping region 61D, is limited, and at the same time, it is possible to limit the turbulence of the flow of the air caused by the shape change at the periphery of the suction port 61 due to the addition of the rib 65.

(Modifications of Fourth Embodiment)

In the fourth embodiment described above, there is exemplified the rib 65 that is formed such that the height of the rib 65 is minimized at each of the two rib ends 651, 652, and the height of the rib 65 is progressively decreased toward each of the two rib ends 651, 652. However, the rib 65 is not limited to this one.

(First Modification)

Figure 13:
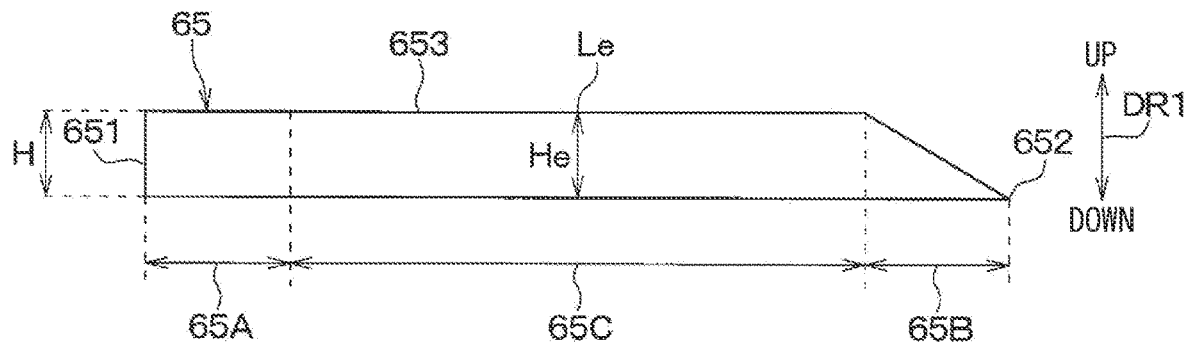
FIG. 13 is a schematic view showing a geometric net of a rib of a first modification.

For example, as shown in FIG. 13, the rib 65 may be formed such that the height of the rib 65 is minimized at the rib end 652 among the two rib ends 651, 652 and is progressively decreased toward the rib end 652. Alternatively, the rib 65 may be formed such that the height of the rib 65 is minimized at the other rib end 651 among the two rib ends 651, 652 and is progressively decreased toward the rib end 651.

(Second Modification)

Figure 14:
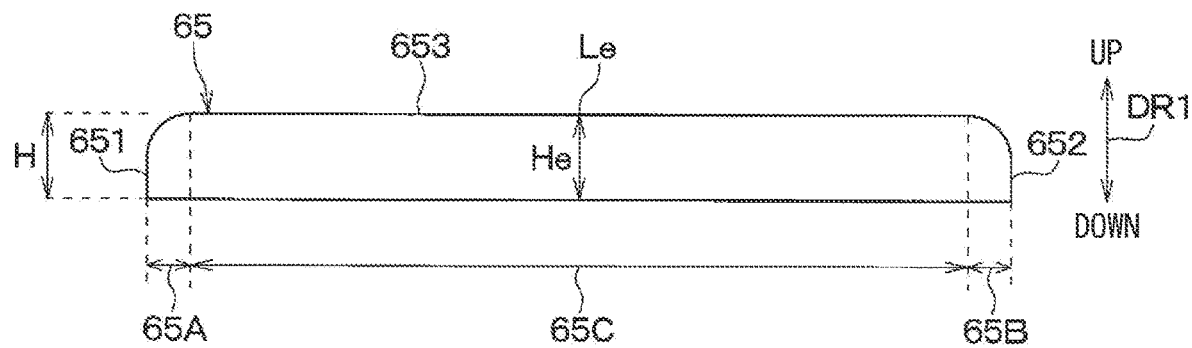
FIG. 14 is a schematic view showing a geometric net of a second modification.

For example, as shown in FIG. 14, the rib 65 may be formed such that each of the end portions 65A, 65B, which respectively have the two rib ends 651, 652, is sloped in a curved form. This may be similarly applied to the case where only the rib end 652 among the two rib ends 651, 652 is sloped.

(Third Modification)

Figure 15:
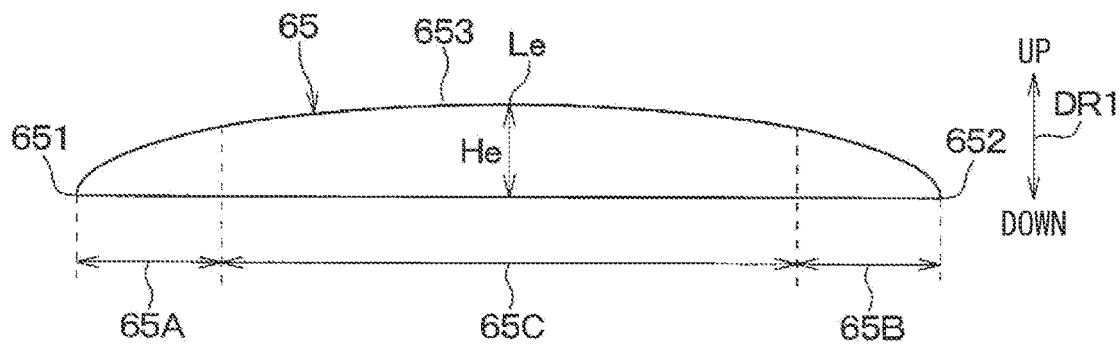
FIG. 15 is a schematic view showing a geometric net of a third modification.

For example, as shown in FIG. 15, the rib 65 may be formed such that the remaining portion 65C of the rib 65, which is other than the end portions 65A, 65B, has the height H which is measured in the axial direction and is progressively increased from each of the two rib ends 651, 652 in a direction away from the rib end 651, 652. In such a case, it is desirable that the height He of the rib 65 measured in the axial direction is maximized at the position Le which overlaps with the winding end Pe in the radial direction. Specifically, the rib 65 is desirably formed such that the remaining portion 65C of the rib 65, which is other than the end portions 65A, 65B, has the height H which is measured in the axial direction and is progressively increased toward the position Le which overlaps with the winding end Pe in the radial direction. This is because the air is most likely to concentrate in the vicinity of the winding end Pe in the radial direction in the non-overlapping region 61D.

Other Embodiments

Although the representative embodiments of the present disclosure have been described above, the present disclosure is not limited to the above-described embodiments and can be variously modified, for example, as follows.

In some of the above embodiments, there is described the example where at the periphery of the suction port 61, the rib 65 is formed to extend along the entire extent of the non-overlapping region 61D and is not formed in the overlapping region 61C. However, the location of the rib 65 is not limited to this. For example, the rib 65 may be formed not only the entire extent of the non-overlapping region 61D but also a portion of the overlapping region 61C at the periphery of the suction port 61.

In the above embodiments, the tube upper end portion 71 is placed at the location where the overlapping area of the tube upper end portion 71, which overlaps with the first half region 61A of the periphery of the suction port 61 in the axial direction, is larger than the other overlapping area of the tube upper end portion 71, which overlaps with the later half region 61B of the periphery of the suction port 61 in the axial direction. However, the arrangement of the tube upper end portion 71 is not limited to this. For example, the tube upper end portion 71 may be placed at a location where the overlapping area of the tube upper end portion 71, which overlaps with the later half region 61B of the periphery of the suction port 61 in the axial direction, is larger than the overlapping area of the tube upper end portion 71, which overlaps with the first half region 61A of the periphery of the suction port 61 in the axial direction.

In the above embodiments, there is described the example where the rib 65 is provided to the bell mouth 60. However, the location of the rib 65 is not limited to this. For example, the rib 65 may be located on the outer side of the bell mouth 60.

In the above embodiments, there is described the example where the maximum height of the rib 65 measured in the axial direction is larger than the width Wb of the bell mouth 60 measured in the radial direction. However, the present disclosure is not limited to this. For example, the maximum height of the rib 65 measured in the axial direction may be equal to the width Wb of the bell mouth 60 in the radial direction.

In the above embodiments, there is described the example where the maximum height of the rib 65 measured in the axial direction is smaller than the size of the predetermined gap G1 between the filter 20 and the suction port forming portion 55. However, the present disclosure is not limited to this. For example, the maximum height of the rib 65 measured in the axial direction may be equal to the size of the predetermined gap G1 between the filter 20 and the suction port forming portion 55. In such a case, the distal end 653 of the rib 65 contacts the filter 20.

In the above embodiments, there is exemplified the case where the maximum height of the rib 65 measured in the axial direction is larger than the size of the gap G2 between the filter 20 and the distal end 653 of the rib 65. However, the present disclosure is not limited to this. For example, the maximum height of the rib 65 measured in the axial direction may be equal to the size of the gap G2 between the filter 20 and the distal end 653 of the rib 65.

As in the above embodiments, it is desirable that the height He of the rib 65 measured in the axial direction at the position Le, which overlaps with the winding end Pe in the radial direction, is equal to or higher than the height H of the rest of the rib 65. However, the present disclosure is not limited to this. For example, the height He of the rib 65 measured in the axial direction at the position Le, which overlaps with the winding end Pe, may be lower than the height H of the rest of the rib 65.

In the above embodiment embodiments, there is described the example where the centrifugal blower 1 of the present disclosure is applied to the vehicle air conditioning apparatus of the two-layer flow type that is configured to separately discharge the outside air and the inside air into the vehicle cabin. However, the centrifugal blower 1 may be widely applied to apparatuses other than the vehicle air conditioning apparatus.

Needless to say, in the above-described embodiments, the components of the embodiment(s) are not necessarily essential except when it is clearly indicated that they are essential and when they are clearly considered to be essential in principle.

In the above-described embodiments, when the numerical values, such as the number, numerical value, quantity, range, etc. of the components of the embodiment(s) are mentioned, the numerical values are not limited to those described in the embodiment(s) except when it is clearly indicated that the numeric values are essential and when the numeric values are clearly considered to be essential in principle.

In the above-described embodiments, when a shape, a positional relationship, etc. of the component(s) is mentioned, the shape, positional relationship, etc. are not limited to those described in the embodiment(s) unless otherwise specified or limited in principle to the those described in the embodiment(s).

CONCLUSION

According to a first aspect disclosed in some or all of the above embodiments, a centrifugal blower includes a fan, a casing and a separation tube. The casing has a suction port forming portion that forms a suction port, into which air is suctioned, and the suction port forming portion is formed at one side of the casing in an axial direction. The separation tube has a tube upper end portion, which forms an air inlet, through which the air flows into an inside of the separation tube. The tube upper end portion is located on one side of the suction port forming portion in the axial direction such that the tube upper end portion overlaps with a portion of the suction port in the axial direction. A rib, which projects toward one side in the axial direction, is formed at a periphery of the suction port of the suction port forming portion. The periphery of the suction port has: an overlapping region, which overlaps with the tube upper end portion in the axial direction; and a non-overlapping region, which does not overlap with the tube upper end portion in the axial direction, and the rib occupies more area in the non-overlapping region than in the overlapping region.

According to a second aspect, a bell mouth, which is configured to guide the air toward the fan, is formed at the periphery of the suction port of the suction port forming portion. The rib is formed in a range that is from an innermost perimeter to an outermost perimeter of the bell mouth such that at least a portion of the rib overlaps with the bell mouth in the axial direction.

In the case where the rib is formed relative to the bell mouth in the above-described manner, since the rib is present in the non-overlapping region, it is difficult for the air to flow toward the fan along the bell mouth. Thus, it is possible to sufficiently limit the concentrated flow of the air in the non-overlapping region.

According to a third aspect, a maximum height of the rib, which is measured in the axial direction, is larger than a width of the bell mouth, which is measured in the radial direction. According to this arrangement, it is possible to reduce the flow of the air, which overflows the rib, so that it is possible to sufficiently limit the concentrated flow of the air to the non-overlapping region.

According to a fourth aspect, a filter, which is configured to filter the air, is placed on the one side of the suction port forming portion in the axial direction such that a gap having a predetermined size is formed between the suction port forming portion and the filter in the axial direction. A maximum height of the rib, which is measured in the axial direction, is smaller than the predetermined size of the gap and is larger than a distance between the filter and a distal end of the rib in the axial direction.

According to this arrangement, a size of the space between the filter and the distal end of the rib is decreased. Thus, it is possible to reduce the flow of the air, which overflows the rib, so that it is possible to sufficiently limit the concentrated flow of the air at the non-overlapping region.

According to a fifth aspect, the casing forms an air passage that is formed between the fan and an outer peripheral wall of the casing such that a passage cross-sectional area of the air passage progressively increases in a rotational direction of the fan while the outer peripheral wall of the casing is shaped in a spiral form and surrounds an outer periphery of the fan. The casing has: a nose where a scroll radius, which is a distance from the fan axis to the outer peripheral wall, is minimized; and a winding end where the scroll radius is maximized. The periphery of the suction port is divided into: a first half region, which is configured to guide the air to an upstream section of the air passage, and a later half region, which is configured to guide the air to a downstream section of the air passage. The tube upper end portion is placed at a location where an overlapping area of the tube upper end portion, which overlaps with the first half region in the axial direction, is larger than another overlapping area of the tube upper end portion, which overlaps with the later half region in the axial direction.

With this configuration, the amount of the air suctioned at the later half region, which guides the air to the downstream section of the air passage having the increased passage cross-sectional area, tends to be increased in comparison to the first half region, which guides the air to the upstream section of the air passage. Furthermore, in the case where the overlapping area of the first half region, which overlaps with the tube upper end portion, is larger than the overlapping area of the later half region, which overlaps with the tube upper end portion, the air will flow more intensively into the later half region, which overlaps with the tube upper end portion in the axial direction.

Therefore, when the rib is arranged such that the rib occupies more area in the non-overlapping region than in the overlapping region, it is possible to limit the concentrated flow of the air in the later half region. Since the flow velocity of the air, which passes through the suction port, is unlikely to increase, the noise of the blower can be limited.

According to a sixth aspect, the tube upper end portion has a tube outer periphery that is placed at a location where the tube outer periphery does not overlap with the nose in the axial direction and overlaps with the suction port in the axial direction. The non-overlapping region is divided into a first region and a second region such that the first region is closer to the nose than the second region, and the second region is farther from the nose than the first region. The rib occupies more area in the first region than in the second region.

According to this, it is possible to limit the amount of the suctioned air in the vicinity of the nose where the flow of the air, which flows into the fan, tends to be largely disturbed, and it is possible to ensure a certain amount of the suctioned air at a position spaced from the nose. Therefore, it is possible to limit a decrease in the fan efficiency caused by the insufficient amount of the suctioned air while limiting the generation of the noise.

According to a seventh aspect, the rib is not located in a range that extends from an overlapping position of the second region, which overlaps with the tube outer periphery, to a position, which is advanced in the rotational direction by a predetermined angle from the overlapping position toward the imaginary line. As described above, when the rib is not formed in the range of the second region, which is adjacent to the tube outer periphery, it is possible to ensure the certain amount of the suctioned air at the position which is adjacent to the overlapping region in the second region. Thereby, it is possible to limit a decrease in the fan efficiency caused by the shortage in the amount of the suctioned air.

According to an eighth aspect, an overlapping portion of the rib, which overlaps with the winding end in the radial direction, has a height that is measured in the axial direction and is equal to or larger than a height of a rest of the rib measured in the axial direction while the rest of the rib is other than the overlapping portion of the rib. When the height of the rib measured in the axial direction is maximized at the overlapping portion of the rib, which overlaps with the winding end, the amount of the suctioned air can be limited at this portion, at which the passage cross-sectional area is relatively large in the air passage and at which the flow of the air toward the fan is likely to be concentrated.

According to a ninth aspect, a height of the rib in the axial direction is minimized at one or more of two rib ends which are two ends of the rib that are opposite to each other in a circumferential direction, and the height of the rib is progressively decreased toward the one or more of the two rib ends.

In the case where the height of the rib measured in the axial direction is progressively decreased toward the at least one of the two rib ends, the air, which flows in the circumferential direction along the rib at the outside of the rib, can be more easily suctioned into the fan by flowing beyond the rib as the flow of the air approaches the rib end. As a result, the air, which flows in the circumferential direction along the rib, enters the fan at entry points which are circumferentially dispersed. Thus, it is possible to limit the concentration of the entry points of the air, which flows in the circumferential direction along the rib and enters the fan, at the rib ends. Thereby, it is possible to limit the generation of the noise near the rib ends.

According to a tenth aspect, the rib has two end portions that respectively have two rib ends which are two ends of the rib and are opposite to each other in a circumferential direction, and each of the two end portions has a height which is measured in the axial direction and is progressively increased from the rib end of the end portion in a direction away from the rib end in the circumferential direction, and a rest of the rib, which is other than the two end portions of the rib, has a height that is measured in the axial direction and is constant in the circumferential direction regardless of a distance from each of the two rib ends in the circumferential direction. Thereby, the amount of the suctioned air, which is suctioned from the non-overlapping region, is limited, and at the same time, it is possible to limit the turbulence of the flow of the air caused by the shape change at the periphery of the suction port due to the addition of the rib.

What is claimed is:

1. A centrifugal blower that is configured to separately suction a first fluid and a second fluid, which are air and have different temperatures or different humidities, respectively, the centrifugal blower comprising:
  a fan that is configured to be rotated about a fan axis such that the fan suctions at least one of the first fluid and the second fluid from one side of the fan in an axial direction of the fan axis and outwardly blows the at least one of the first fluid and the second fluid in a radial direction of the fan axis;
  a casing that receives the fan; and
  a separation tube, at least a portion of which is placed on an inner side of the fan, wherein the separation tube is configured to separately guide the first fluid and the second fluid to the fan in a state where the first fluid and the second fluid are located at an inside and an outside, respectively, of the separation tube, wherein:
  the casing has a suction port forming portion that forms a suction port, into which the air is suctioned, wherein the suction port forming portion is formed at one side of the casing in the axial direction;
  the separation tube has a tube upper end portion, which forms an air inlet, through which the air flows into the inside of the separation tube;
  the tube upper end portion is located on one side of the suction port forming portion in the axial direction such that the tube upper end portion overlaps with a portion of the suction port in the axial direction;
  a rib, which projects toward one side in the axial direction, is formed at a periphery of the suction port of the suction port forming portion; and
  the periphery of the suction port has:
    an overlapping region, which overlaps with the tube upper end portion in the axial direction; and
    a non-overlapping region, which does not overlap with the tube upper end portion in the axial direction; and
    the rib occupies more area in the non-overlapping region than in the overlapping region.

2. The centrifugal blower according to claim 1, wherein:
  a bell mouth, which is configured to guide the air toward the fan, is formed at the periphery of the suction port of the suction port forming portion; and
  the rib is formed in a range that is from an innermost perimeter to an outermost perimeter of the bell mouth such that at least a portion of the rib overlaps with the bell mouth in the axial direction.

3. The centrifugal blower according to claim 2, wherein a maximum height of the rib, which is measured in the axial direction, is larger than a width of the bell mouth, which is measured in the radial direction.

4. The centrifugal blower according to claim 2, wherein:
  a filter, which is configured to filter the air, is placed on the one side of the suction port forming portion in the axial direction such that a gap having a predetermined size is formed between the suction port forming portion and the filter in the axial direction; and
  a maximum height of the rib, which is measured in the axial direction, is smaller than the predetermined size of the gap and is larger than a distance between the filter and a distal end of the rib in the axial direction.

5. The centrifugal blower according to claim 1, wherein:
  the casing forms an air passage that is formed between the fan and an outer peripheral wall of the casing such that a passage cross-sectional area of the air passage progressively increases in a rotational direction of the fan, wherein the outer peripheral wall of the casing is shaped in a spiral form and surrounds an outer periphery of the fan, and the casing has:
    a nose where a scroll radius, which is a distance from the fan axis to the outer peripheral wall, is minimized; and
    a winding end where the scroll radius is maximized;
  the periphery of the suction port is divided into a first half region and a later half region by a reference line, which extends through both of the fan axis and the nose, such that the first half region is configured to guide the air to an upstream section of the air passage, and the later half region is configured to guide the air to a downstream section of the air passage, and
  the tube upper end portion is placed at a location where an overlapping area of the tube upper end portion, which overlaps with the first half region in the axial direction, is larger than another overlapping area of the tube upper end portion, which overlaps with the later half region in the axial direction.

6. The centrifugal blower according to claim 5, wherein:
  the tube upper end portion has a tube outer periphery that is placed at a location where the tube outer periphery does not overlap with the nose in the axial direction and overlaps with the suction port in the axial direction;
  the non-overlapping region is divided into a first region and a second region by an imaginary line, which extends through the fan axis and is perpendicular to the tube outer periphery, such that the first region is closer to the nose than the second region, and the second region is farther from the nose than the first region; and
  the rib occupies more area in the first region than in the second region.

7. The centrifugal blower according to claim 6, wherein the rib is not located in a range that extends from an overlapping position of the second region, which overlaps with the tube outer periphery, to a position, which is advanced in the rotational direction by a predetermined angle from the overlapping position toward the imaginary line.

8. The centrifugal blower according to claim 5, wherein an overlapping portion of the rib, which overlaps with the winding end in the radial direction, has a height that is measured in the axial direction and is equal to or larger than a height of a rest of the rib measured in the axial direction while the rest of the rib is other than the overlapping portion of the rib.

9. The centrifugal blower according to claim 1, wherein a height of the rib measured in the axial direction is minimized at one or more of two rib ends which are two ends of the rib that are opposite to each other in a circumferential direction, and the height of the rib is progressively decreased toward the one or more of the two rib ends.

10. The centrifugal blower according to claim 1, wherein:
the rib has two end portions that respectively have two rib ends which are two ends of the rib and are opposite to each other in a circumferential direction, and each of the two end portions has a height which is measured in the axial direction and is progressively increased from the rib end of the end portion in a direction away from the rib end in the circumferential direction; and
a rest of the rib, which is other than the two end portions of the rib, has a height that is measured in the axial direction and is constant in the circumferential direction regardless of a distance from each of the two rib ends in the circumferential direction.

* * * * *